United States Patent
De Gaudenzi et al.

(10) Patent No.: US 7,123,663 B2
(45) Date of Patent: Oct. 17, 2006

(54) CODED DIGITAL MODULATION METHOD FOR COMMUNICATION SYSTEM

(75) Inventors: Ricardo De Gaudenzi, Leiden (NL); Alberto Guillen i Fabregas, Antibes (FR); Alfonso Martinez Vicente, Leiden (NL); Beatrice Ponticelli, Florence (IT)

(73) Assignee: Agence Spatiale Europeenne, Paris (FR)

( * ) Notice: Subject to any disclaimer, the term of this patent is extended or adjusted under 35 U.S.C. 154(b) by 606 days.

(21) Appl. No.: 10/163,167

(22) Filed: Jun. 4, 2002

(65) Prior Publication Data

US 2003/0223507 A1 Dec. 4, 2003

(51) Int. Cl.
*H04L 27/18* (2006.01)

(52) U.S. Cl. ..................... 375/279; 375/308
(58) Field of Classification Search ................ 375/279, 375/268, 269, 295, 298, 308; 370/269
See application file for complete search history.

(56) References Cited

U.S. PATENT DOCUMENTS

| | | | |
|---|---|---|---|
| 5,519,733 A | 5/1996 | Huang | |
| 6,005,897 A * | 12/1999 | McCallister et al. | 375/340 |
| 6,507,628 B1 * | 1/2003 | McCallister et al. | 375/341 |
| 6,553,063 B1 * | 4/2003 | Lin et al. | 375/223 |
| 6,690,746 B1 * | 2/2004 | Sills et al. | 375/316 |
| 2002/0037062 A1 * | 3/2002 | Riess et al. | 375/348 |
| 2002/0071384 A1 * | 6/2002 | Hall et al. | 370/203 |
| 2002/0080867 A1 * | 6/2002 | Abbas et al. | 375/222 |
| 2002/0118772 A1 * | 8/2002 | Lin | 375/285 |
| 2003/0043732 A1 * | 3/2003 | Walton et al. | 370/208 |
| 2003/0152155 A1 * | 8/2003 | Peeters | 375/260 |
| 2005/0074068 A1 * | 4/2005 | Borran et al. | 375/264 |

FOREIGN PATENT DOCUMENTS

| | | |
|---|---|---|
| EP | 0 583 059 | 2/1994 |
| EP | 1 164 763 | 12/2001 |

* cited by examiner

*Primary Examiner*—Chieh Fan
*Assistant Examiner*—Naheed Ejaz
(74) *Attorney, Agent, or Firm*—Lipsitz & McAllister, LLC

(57) ABSTRACT

A new class of 16-ary Amplitude and Phase Shift Keying (APSK) coded modulations, called double-ring APSK modulation, based on an amplitude and phase shift keying constellation in which the locations of the digital signals to be encoded are placed on two concentric rings of equally spaced signal points. The APSK constellation parameters are optimised so as to pre-compensate the impact of non-linearities. The new modulation scheme is suited for being used with different coding schemes. It is shown that, for the same coding scheme, pre-distorted double-ring APSK modulation significantly outperforms classical 16-QAM and 16-PSK over a typical satellite channel, due to its intrinsic robustness against the high power amplifier non-linear characteristics. The proposed coded modulation scheme is shown to provide a considerable performance advantage for future satellite multi-media and broadcasting systems.

12 Claims, 22 Drawing Sheets

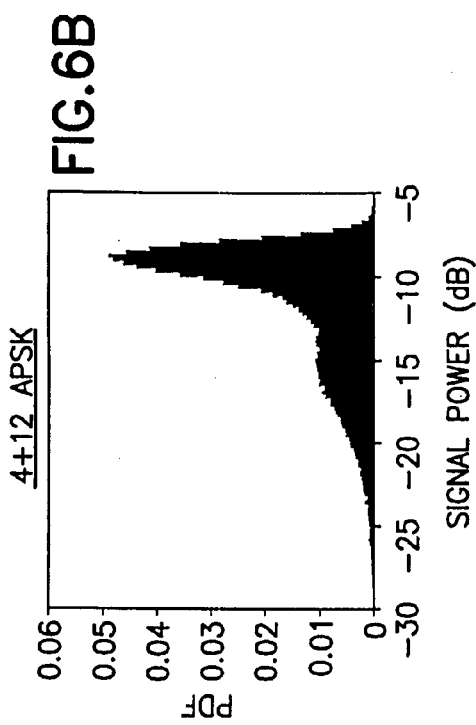
FIG.6A  16 QAM
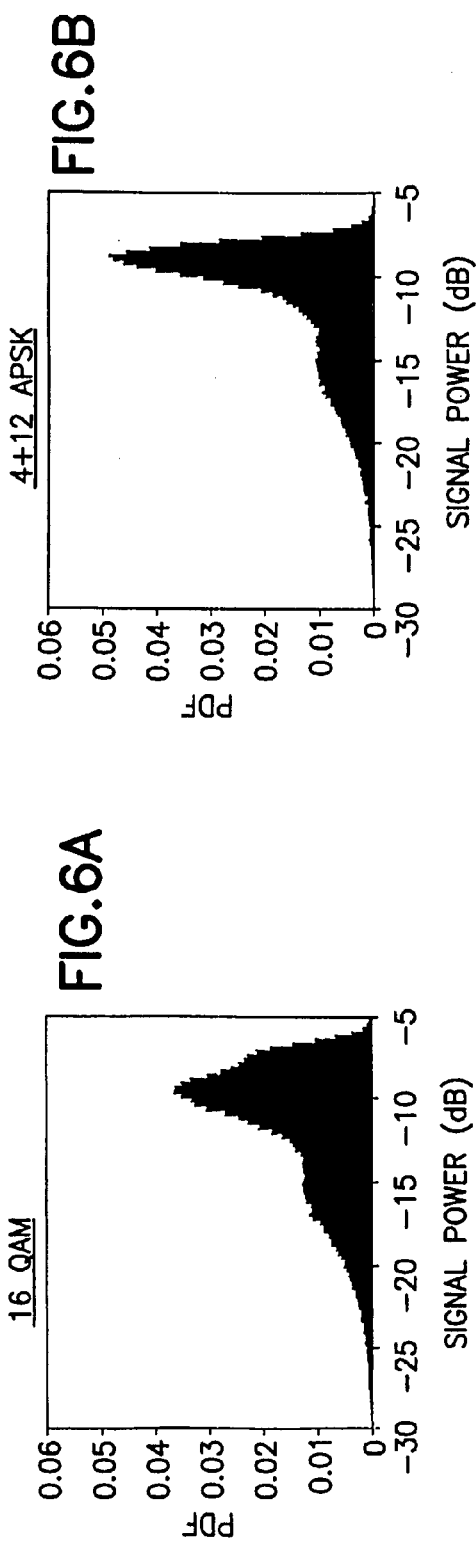
FIG.6B  4+12 APSK
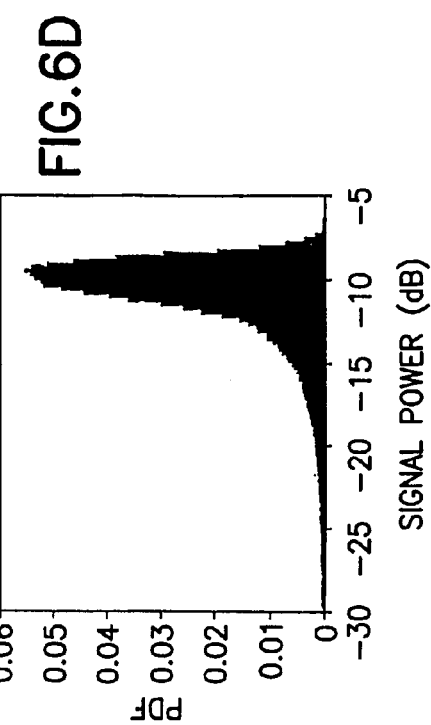
FIG.6C  6+10 APSK
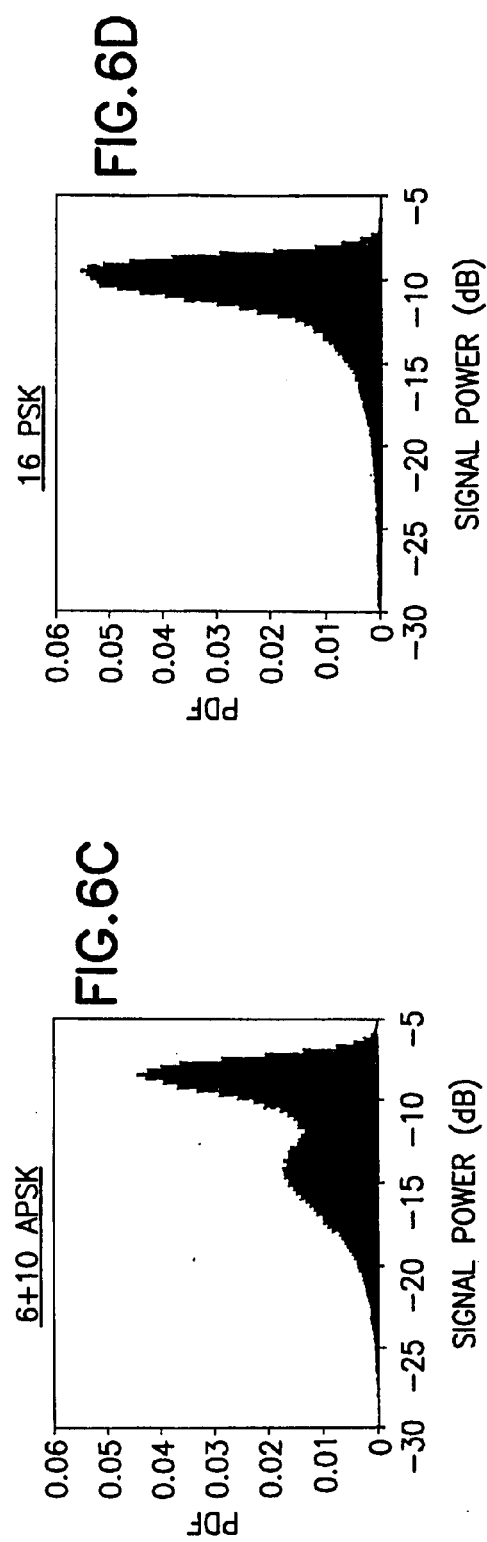
FIG.6D  16 PSK

CODED DIGITAL MODULATION METHOD FOR COMMUNICATION SYSTEM

BACKGROUND OF THE INVENTION

In parallel to the growing capabilities of optical fibre to carry ultra-high speed digital information, satellite communication systems undoubtedly represent a big success thanks to their ability to efficiently broadcast digital multi-media information over very large areas. A notable example is the so-called direct-to-home (DTH) digital television broadcasting. Satellite systems also provide a unique way to complement the terrestrial infrastructure. This is the case, for instance, for satellite news gathering systems linking mobile TV stations to the central production facility or the multi-media satellite systems currently under development.

These systems, either existing or in preparation for the near future, are likely to require higher bit rates than before, thus extracting as many bits per second as possible from the available bandwidth becomes a necessity. This calls in turn for the use of higher-order modulations, combined with state-of-the-art coding schemes.

It is well known that for satellite channels the constellation 16-QAM (Quadrature Amplitude Modulation), although providing twice the spectral efficiency of the widely used QPSK (Quadrature Phase Shift Keying), suffers greatly from satellite amplifier non-linearity effects. To-day, trellis coded (TC) 16-QAM has been adopted for high speed satellite links (e.g. TV contributions) at the cost of higher operating link signal-to-noise ratios (Eb/No increase of typically 4–4.5 dB) and a larger operational amplifier output back-off (OBO) (typically 3 to 5 dB). See for instance M. Cominetti and A. Morello, *Digital Video Broadcasting over satellite (DVB-S): a system for broadcasting and contribution applications*, Int. Jour. on Satellite Commun., 2000, No. 18, pp. 393–410.

It has been observed that the distance between pairs of constellation points is far from uniform and a few points are indeed very close to each other, thereby significantly reducing the minimum distance between constellation points. The current demand for bandwidth efficient high-speed satellite communication links calls for the development of more effective alternatives to 16-QAM. An alternative would be the use of 16-PSK, which is known to be more resilient to non-linear channels. However, the signal-to-noise ratio required for this modulation is higher than that of 16-QAM, removing some of its attractiveness.

The topic of high-order constellation optimization has already been addressed for band-limited linear channels. To the inventors' knowledge however, there are few references in the literature dealing with 16-ary constellation optimization over non-linear channels. Former work related to digital modulation techniques with spectral efficiencies up to 3 bit/s/Hz in non-linear satellite channels showed that 16-QAM does not compare favourably with either TC 16-PSK or uncoded 8-PSK. As an example, S. G. Wilson, H. A. Sleeper II, P. J. Schottler and M. T. Lyons (*Rate 3/4 Convolutional Coding of 16-PSK. Code Design and Performance Study*, IEEE Trans. on Commun., Vol. COM-32, No.12, December 1984) pointed out that rate-3/4 TC 16-PSK gains only a few tenths of a dB over uncoded 8-PSK in a typical satellite channel, assuming perfect carrier phase and clock timing recovery, so that the additional complexity inherent in coded 16-PSK system does not appear to be justified. Also, E. Biglieri (*High-Level Modulation and Coding for Nonlinear Satellite Channels*, IEEE Trans. on Commun. N. 5, May 1984) performed a comparison between TC 16-QAM and 16-PSK systems over non-linear channels, concluding that 16-PSK outperforms 16-QAM, but the author explicitly excluded the possibility of pre-distorting the signal constellation to counteract non-linear distortions.

A possible improvement for TC 16-QAM exploitation over non-linear satellite channels was proposed by R. De Gaudenzi and M. Luise, in *Design and Analysis of an All-Digital Demodulator for Trellis Coded 16-QAM Transmission over a Nonlinear Satellite Channel*, IEEE Trans. on Comm., Vol.43, No.2/3/4, February/March/April 1995, part I. In this reference it was shown that through trellis decoder metric ad-hoc computation the bit error rate (BER) performance can be improved by about 2 dB compared to conventional TC-16-QAM. However, the post-compensation provided by the trellis decoder metric computation does not prevent the losses due to the distorted constellation shape caused by the High Power Amplifier (HPA).

The purpose of the present invention is to optimize the transmission of digitally modulated signals on non-linear channels rather than only attempt to compensate the satellite non-linearity effects a posteriori. The intuition for the present invention follows the experimental observation of the 16-QAM-constellation distortion caused by the HPA. The challenge here is to combine coding efficiency with the required coding rate flexibility and simple matching to the demodulator. This approach is expected to provide an appreciable advantage in terms of overall efficiency compared to more conventional solutions.

SUMMARY OF THE INVENTION

It is one object of the present invention to provide a digital modulation method which increases the digital signal transmission spectral efficiency over non linear terrestrial and satellite channels combining a high power efficiency with modulation/demodulation simplicity.

Another object of the invention is to optimise the signal constellation parameters according to minimum Euclidean distance and capacity maximization for linear and non linear AWGN channels.

Yet another object of the invention is to provide a method for simply pre-compensating satellite or ground station non linear amplifier AM/AM and AM/PM distortion effects with no practical complexity increase of the modulator and demodulator units.

In accordance with the invention, there is provided a new 16-ary Amplitude Phase Shift Keying (APSK) coded modulation scheme based on an amplitude and phase shift keying constellation in which the locations of the digital signals to be encoded are placed on two concentric rings of equally spaced signal points having radius respective radii R1 and R2, and a predetermined relative phase shift $\phi$ between the inner and outer ring PSK constellations.

In a preferred embodiment, the radii of the inner and outer rings and the angle are selected so as to pre-compensate distortion effects of a high power amplifier (HIPA). The total number of signal points on the inner and outer rings is preferably 16, but larger constellations can be envisaged. A particular constellation selection consists of 4 signal points on the inner ring and 12 signal points on the outer ring. This constellation, named 4+12-PSK constellation, is considered to be very efficient over non-linear satellite channels using simple pre-compensation.

The pre-distortion method proposed with this invention has major advantages in terms of simplicity as compared to known pre- or post-compensation schemes and is particularly suited for broadcasting/multicasting applications being implemented at the central modulator side.

The double ring 16-ary Amplitude and Phase Shift Keying (APSK) modulation schemes of the invention are particularly suited for use with the known Trellis and Turbo encoding schemes. These modulations achieve high spectral efficiency with good robustness against non-linear distortion effects. They provide a good bridge between 16-QAM and 16-PSK, as their performance for linear channels is very close to that of 16-QAM, and for non-linear channels they perform better than the 16-PSK scheme.

A particular feature of the invention is to couple a powerful binary turbo code to the M-ary ASPK modulator and demodulator. Advantageously, a binary serial turbo code is generated by combining a classical binary convolutional code with a simple accumulator acting as serially concatenated code through a random block interleaver. The wanted coding rate is achieved through the outer code rate selection, the inner code rate being one. The outer code can be either the optimum binary code with given rate or the punctured version of a lower rate convolutional code (rate ½ in the preferred embodiment). The proposed scheme allows simple decoder implementation, easy adaptability to variable M-ASPK constellation sizes and low bit error rate floor. The number of states of the outer code is determined in order to achieve the required bit error rate performance.

The ASPK demodulator is interfaced to a turbo decoder through a block interleaver and Gray mapping on the signal constellation. This sub-optimum approach allows for simpler decoder implementation while providing minor impairment compared to optimal coding and modulation techniques requiring much more complex decoding processing.

A simple yet robust (non-data-aided) digital blind carrier phase recovery scheme based on constellation points four quadrants phase averaging is used with a complexity comparable to decision-directed QSPK phase estimator, thereby allowing for the utilization of powerful capacity approaching codes.

The new class of modulation schemes of the present invention, called double-ring 16-ary modulations, has shown to provide capacity performance very close to, and even slightly better than the capacity of classical coded 16-QAM over AWGN linear channels. For non-linear satellite channels, the so-called 4+12-PSK double-ring constellation has shown improved robustness to non-linear effects compensated for a minor loss in performance with respect to 16-QAM over AWGN linear channels. Using simple yet efficient pre-distortion and turbo coding, the proposed 4+12-APSK constellation scheme has shown to achieve a significant improvement in power efficiency with slightly better spectral efficiency as compared to TCM-16-QAM currently adopted for high-speed satellite links with linear equalization. The result is obtained with no complexity increase in the demodulator as it can be easily implemented digitally with a complexity comparable to a QPSK demodulator.

The invention allows to combine the high spectral efficiency of 16-ary ASPK modulation scheme with the high power efficiency required by to-day wireless systems exploiting high power amplifiers working in the non linear region. A gain of about 5 dB in terms of power efficiency and 8% in tenns of spectral efficiency is obtained with the invention as compared to currently proposed DVB-SNG trellis-coded 16-QAM scheme over a typical satellite Travelling Wave Tube Amplifier (TWTA).

Although the features of the invention have been demonstrated for 16-ary modulations through the preferred turbo coded 4+12-APSK with Gray mapping embodiment, the invention techniques can also be easily extended and applied to higher order modulations with mappings different than Gray, as well as to other capacity approaching coding schemes such as, for instance, LDPC or (I)RA codes.

BRIEF DESCRIPTION OF THE DRAWINGS

FIGS. 6A–6D show simulated histograms of the transmitted signal envelope for four typical signal constellations, respectively;

DESCRIPTION OF PREFERRED EMBODIMENTS OF THE INVENTION

Figure 1:
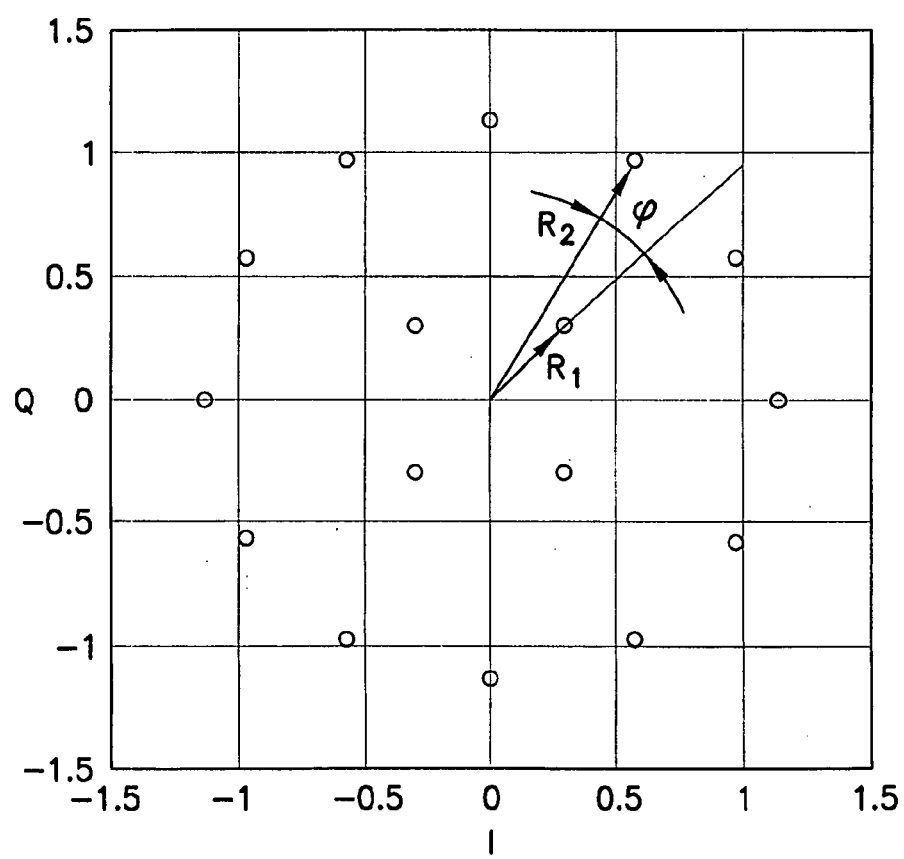
FIG. 1 illustrates a double-ring 16-APSK signal constellation according to the invention.
Figure 2:
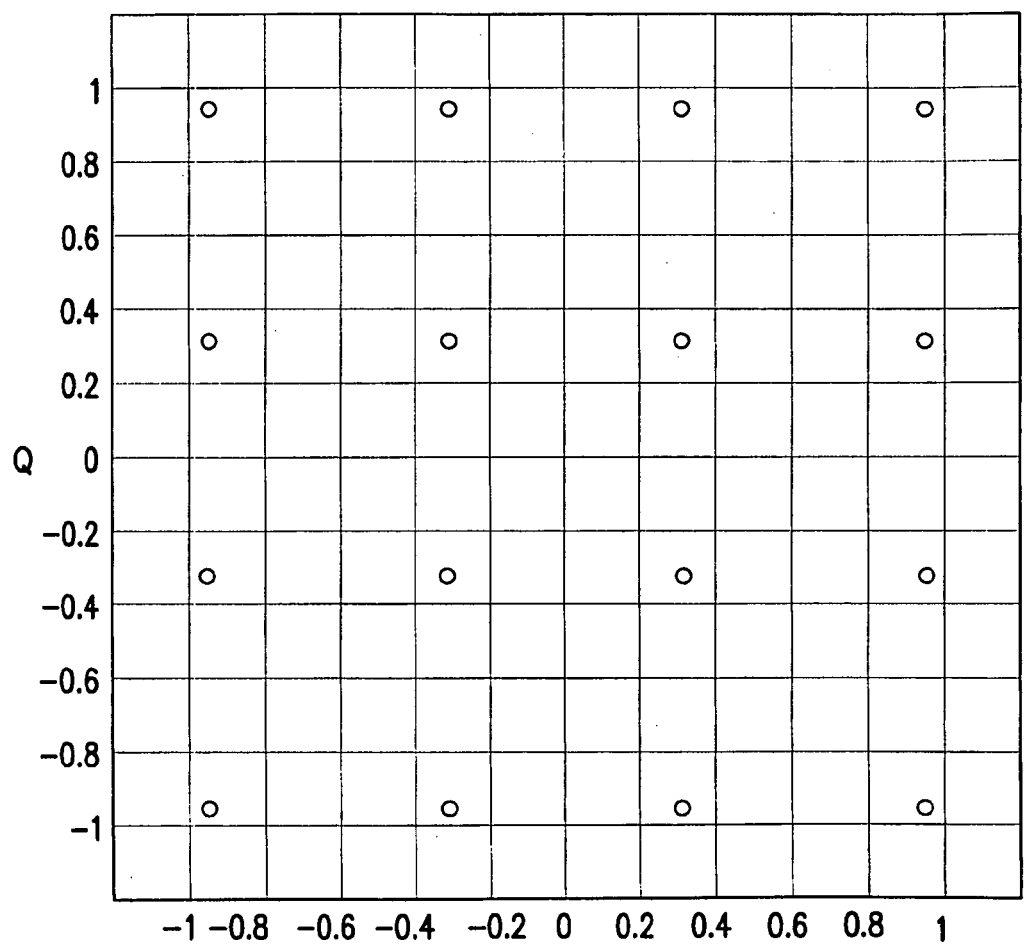
FIG. 2 illustrates a conventional 16-QAM signal constellation.

The proposed method of the invention is based on an amplitude phase shift keying constellation as illustrated in FIG. 1 It is composed of two concentric rings of uniformly spaced points, respectively N1 and N2 in the inner and outer rings. In the example illustrated, N1=4 and N2=12. Obviously we have N1+N2=M=16. For N1=0 the constellation collapses to the well-known 16-PSK, from which incremental variations can be obtained by simply changing the value of N1. Compared to the conventional 16-QAM, the new modulation scheme has the advantages of being characterized by smaller envelope fluctuations and of simplifying the HPA pre-compensation function at modulator level (see later herein). For the sake of completeness, the conventional 16-QAM constellation is illustrated in FIG. 2. Unless otherwise stated, all the constellations shown herein are normalized in energy.

Possible extensions to higher order modulation (i.e. M>16) are straightforward, either by keeping the two rings and changing N1, N2 or by increasing the number of rings, and consequently reducing the number of points per ring.

The proposed double-ring APSK modulation is characterized by two parameters:

$\rho = R_2/R_1$, where $R_1$ and $R_2$ are the radii of the internal and external rings respectively. Recalling the normalized average power condition, we have $N_1 R_1^2 + N_2 R_2^2 = 1$;

$\phi$ is the relative phase shift between the inner and outer ring constellations.

The modulation points are then complex numbers ž, given by roots of unity located in two circles of radii $R_1$ and $R_2$:

$$\check{z} = \begin{cases} R_1 \exp(j\Psi_i^1), \Psi_i^1 = \frac{2\pi i}{N_1}, i = 0, \ldots, N_1 - 1 \text{ in the inner ring} \\ R_2 \exp(j\Psi_i^2), \Psi_i^2 = \frac{2\pi i}{N_2} + \varphi, i = 0, \ldots, N_2 - 1 \text{ in the outer ring} \end{cases} \quad (1)$$

Obviously the constellation defined this way remains the same for any rotation, or change of phase applied to each and every point. FIG. 1 shows a particular 16-APSK constellation, where the whole constellation has been rotated by 45 degrees with respect to the points in the equation above (this rotation is irrelevant to further purposes, and it is due to aesthetic reasons}.

The above double-ring complex signal envelope expression in the time domain is:

$$\check{s}_{TX}(t) = \sqrt{P \sum_{k=-\infty}^{\infty} \check{Z}(k) g_T(t - kT_s)} \quad (2)$$

where P is the signal power, Ž(k) is the k-th complex-valued symbol, drawn from the alphabet of eq.(1), $g_T(t)$ is the transmission filter impulse response and $T_s = T_b' \log_2(M)$ is the channel symbol duration with $T_b' = rT_b$} being the coded bit duration, r the coding rate and $T_b$ the bit interval of the information source.

The idea developed here is to optimize the transmitted signal constellation taking into account the non-linear channel nature, together with the potential improvement of demodulation performance through simple constellation pre-distortion.

The constellation can be optimized by following two different approaches. The simplest, and probably the most intuitive way of looking into the problem is to compute all the possible distances between all different pairs of points in order to determine the minimum distance as a function of the parameters $\rho$ and $\phi$. This approach, however, does not take into account the full geometric properties of the constellation. It is reasonable that the performance, in a general case, does depend on the set of all distances between pairs of constellation points. In this case, a formula is needed that exploit all these values. Constellation optimisation can be made by either maximizing the minimum constellation points distance or by determining the maximum channel capacity.

The minimum distance between constellation points can be determined by simple geometrical calculations. The expressions for the constellation points distances for the generic $N_1+N_2$-PSK constellations are:

$$d_{int} = \sqrt{(2(1 - \cos(2\pi/N_1)))/\sqrt{(1/16(N_1 + N_2\rho^2))}} \quad (3)$$

$$d_{ext} = \rho\sqrt{(2(1 - \cos(2\pi/N_2)))/\sqrt{(1/16(N_1 + N_2\rho^2))}}$$

$$d_{inter} = \sqrt{(1 + \rho^2 - 2\rho\cos\varphi)}/\sqrt{(1/16(N_1 + N_{2\rho}^2))}, \varphi \in (-\pi/N_2, \pi/N_2)$$

where $d_{int}$ and $d_{ext}$ are the distances between points in the internal and external rings respectively, and $d_{inter}$ is the minimum distance between internal and external ring points.

Figure 3:
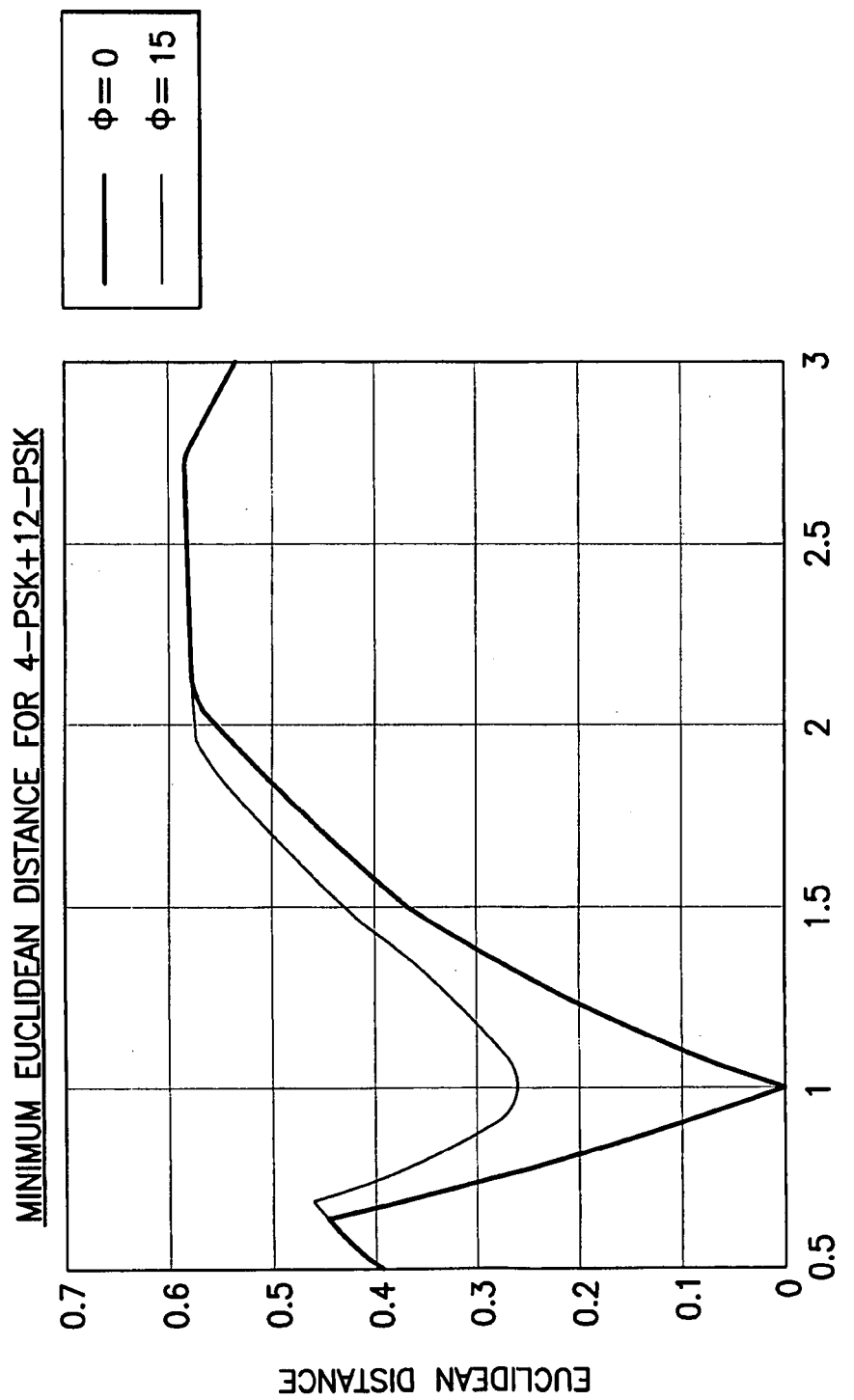
FIG. 3 is a diagram showing the variation of the minimum distance between constellation points for a 4+12 PSK signal constellation according to the invention.
Figure 4:
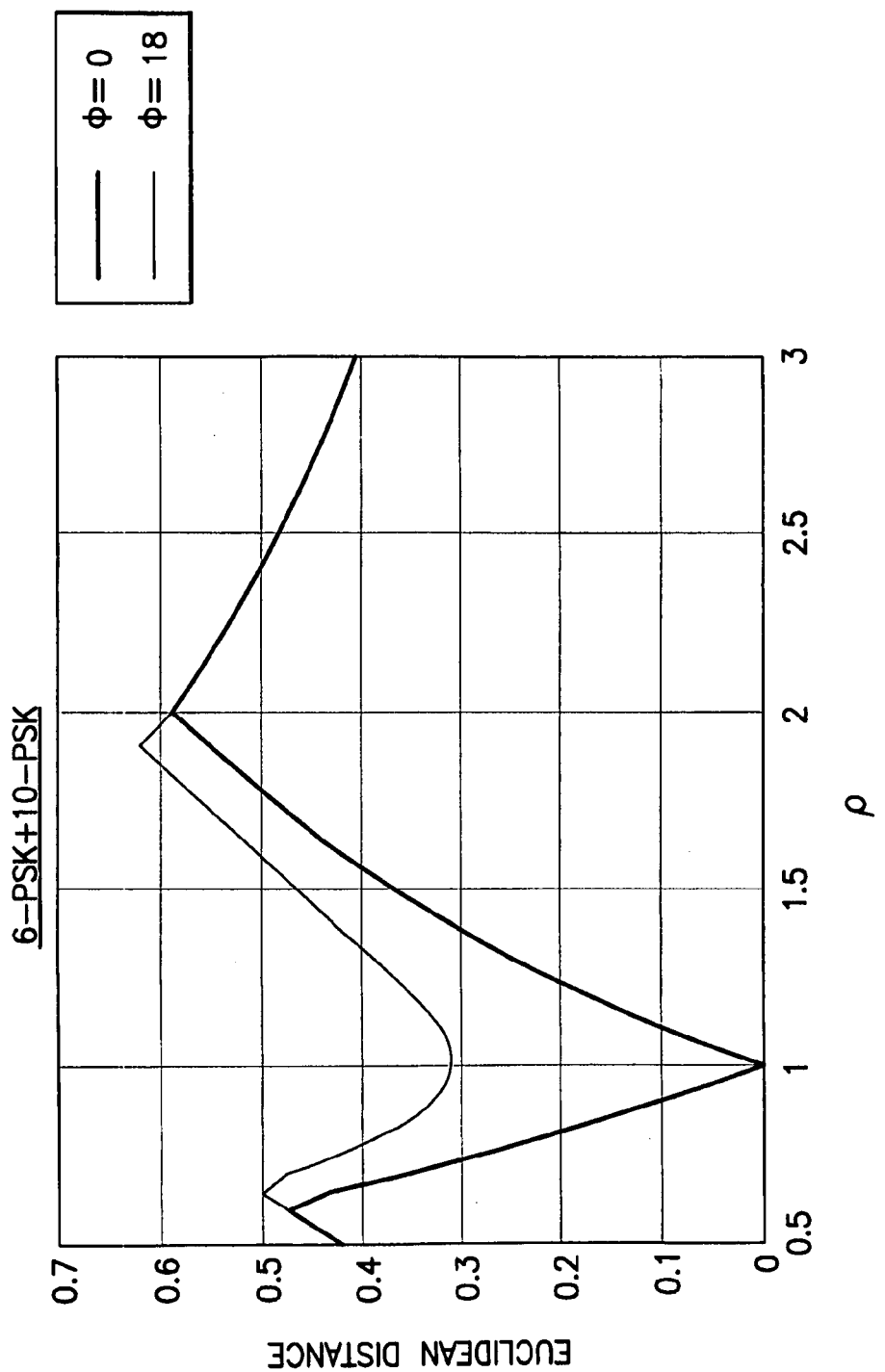
FIG. 4 is a diagram showing the variation of the minimum distance between constellation points for a 6+10 PSK signal constellation according to the invention.

It has been observed that the minimum distance between constellation points varies as a function of $\rho$. Furthermore, from FIGS. 3 and 4 it may be observed that the highest minimum distance is achieved for $\rho=2.732$ in the first case and for $\rho=2.0$ in the second. The larger minimum distance observed for 6+10-PSK can be explained observing the more uniform constellation points distribution in the signal space, yielding a slightly better performance.

The second constellation parameter to be optimized is the relative phase $\phi$ between the inner and outer ring points. Considering the constellation symmetry, it is easy to see that φ can be varied over the range (0, Π/N$_2$) i.e. to maxima of 15 and 18 degrees respectively for the 4+12-APSK and 6+10-APSK cases. By utilizing the ρ{opt} value previously found, no improvement is obtained by modifying φ for the first case as far as the maximum minimum distance is concerned.

Another approach for the optimization of the signal constellation over AWGN channels is to resort to information theory tools in order to compare the performance of coded digital modulation schemes. For our purposes, the relevant parameter is the channel capacity, i.e. the rate beyond which transmission with an arbitrarily low error probability is possible, or equivalently, the maximum spectral efficiency achievable with a given modulation at a given SNR. In particular, the capacity of two-dimensional APSK constellations over a band-limited AWGN channel with no inter-symbol interference will be optimized as a function of N1, N$_2$, ρ and φ.

Before stating Shannon's well-known capacity formula, we need some preliminary notation. Let us use the following discrete model:

$$y_k = x_k + n_k \quad (4)$$

where $y_k$ is the received signal complex sample corrupted by AWGN, $x_k$ is the complex signal transmitted, with average signal energy $E_s$ and a channel signaling interval of duration $T_s = 1/W$. $N_o/2$ is the two-sided noise power spectral density; $n_k$ are complex Gaussian random variables with variance $N_o/2$ in each of the real and imaginary parts.

The unconstrained channel capacity, that is, the capacity C of a band-limited AWGN channel with bandwidth W is given by:

$$C = W \log_2(1 + E_s/N_0) \text{bit/s} \quad (5)$$

where unconstrained means that the modulation can vary freely among signalling intervals. In the case where we use a specific modulation constellation, namely a set of M complex numbers $\alpha_k$, k=1, ... M, the channel capacity can be shown to be (see D. J. Costello, Jr. J. Hagenauer, H. Imai, S. B. Wicker, *Applications of Error Control Coding*, IEEE Trans. on Inform. Theory, Vol.44, pp.2531–2560, October 1998):

$$C(E_s/N_0) = \quad (6)$$
$$\log_2 M - 1/M \sum_{i=0}^{M-1} E\left\{\log_2\left[\sum_{j=0}^{M-1} \exp(-|\alpha_i + n - \alpha_j|^2 - |n|^2 /N_0)\right]\right\}$$

where, as before, $\alpha_i$ and $\alpha_j$ are the complex signal representations of two constellation points, with average signal $E_s$, and n is a complex noise sample.

The channel symbol SNR in terms of the capacity C and the average energy per bit to noise spectral density $E_b/N_0$ is:

$$E_S/N_0 = C(E_S/N_0)E_b/N_0 \quad (7)$$

The expression of channel capacity derived in equation (6) cannot be computed in a closed form, which implies that numerical integration, or Monte Carlo simulation (exploiting the noise random variable) are required. It has been observed that for a linear channel 16-QAM outperforms M-PSK modulations with M=2,4,8,16 in terms of channel capacity for a wide range of $E_b/N_0$.

Using expression (6), the channel capacity of both 16-APSK modulation schemes (namely 4+12-APSK and 6+10-APSK) has been computed for $E_s/N_0 = 12$ dB. It is assumed that for the whole range of $E_b/N_0$ (or equivalently $E_s/N_0$, the curves do not cross nor overlap. This is a good approximation to the fact that all modulations overlap asymptotically at low SNR at the ultimate Shannon limit $E_b/N_0 = -1.59$ dB. At high SNR for a given modulation cardinality the capacity curves overlap asymptotically at the number of bits per symbol. Under the above hypothesis the parameter optimization can be performed. The selected $E_s/N_0 = 12$ dB allows for reliable numerical constellation optimization in a reasonable amount of time.

Figure 5:
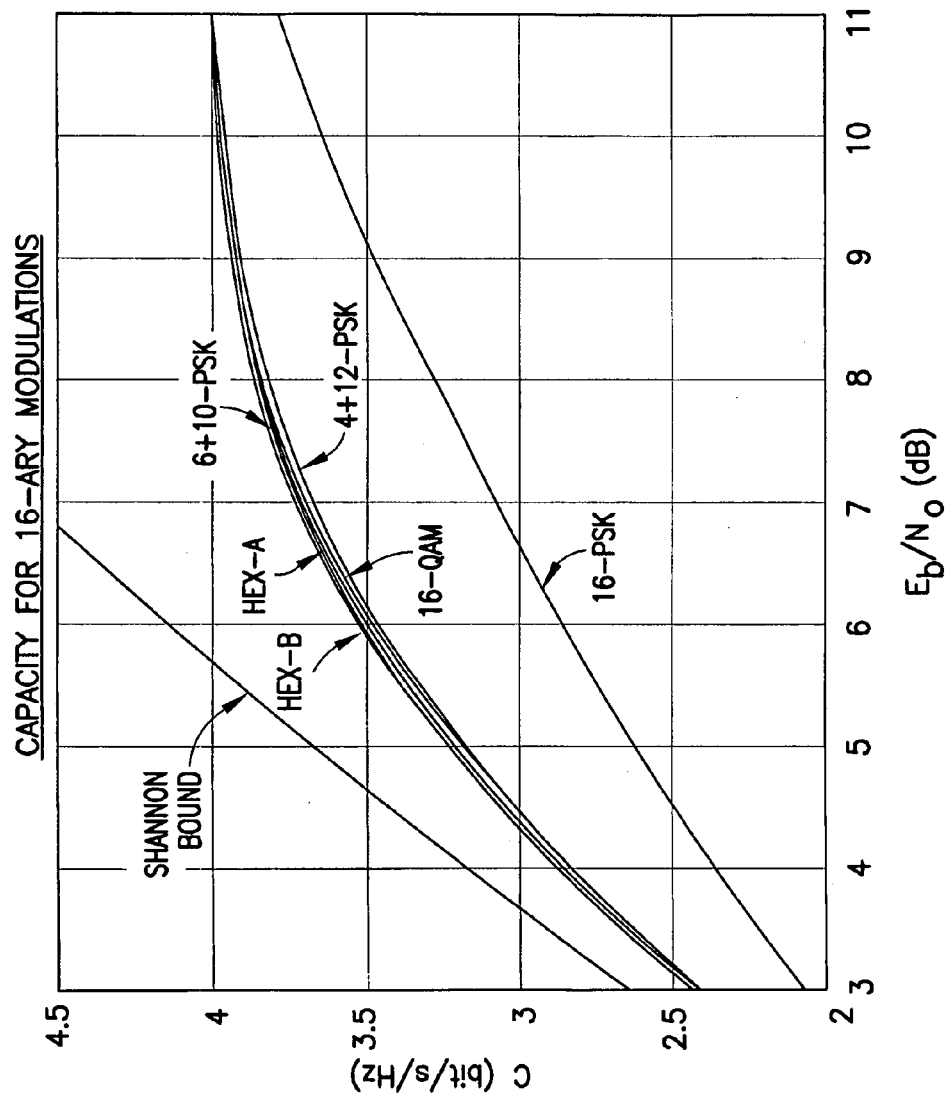
FIG. 5 is a diagram showing the channel capacity for different signal constellations.

The curves of channel capacity for the optimized 16-APSK modulations are shown in FIG. 5 where it may be observed that the capacity bounds for 16-QAM, 4+12-APSK and 6+10-APSK are very close for the AWGN linear channel. Taking into account the previous discussion, it is expected that 4+12-APSK or 6+10-APSK modulation formats are likely to outperform 16-QAM over the non-linear channel.

Despite the result of FIG. 5 showing a slight capacity advantage for 6+10-APSK with respect to 4+12-APSK, considering the non-linear channel application the latter constellation has been preferred, as the presence of more points in the outer ring will allow maximizing the HPA DC efficiency. This is because the inner points will be transmitted at a lower power, to which corresponds a lower DC efficiency.

FIGS. 6A–6D show the distribution of the transmitted signal envelope for four constellations, namely, 16-QAM (FIG. 6A), 4+12-APSK (FIG. 6B), 6+10-APSK (FIG. 6C) and 16-PSK (FIG. 6D). The shaping filter is a square-root raised cosine with a roll-off factor α=0.35. It can be noticed that the 4+12-APSK envelope is more concentrated around the (common) outer ring amplitude than 16-QAM and 6+10-APSK, being remarkably close to the 16-PSK case. This shows that the selected constellation represents a good trade-off between 16-QAM and 16-PSK, with error performance close to 16-QAM, and resilience to non-linearity close to 16-PSK.

An interesting point is the influence of the shaping pulse on the performance. It is clear that the distorted signal is the train of modulated symbols, and that both the modulation and the pulse shape are important. The shaping pulse creates inter-symbol interference at the receiver in the absence of a correct matched-filter, and this degrades the performance.

Another aspect of the present invention is directed to mitigating the effect of the satellite channel non-linearity. Several techniques have been proposed in the past to pre-compensate for HPA distortion for a QAM signal (A. Bernardini and S. De Fina, *Analysis of different optimization criteria for IF predistortion in digital radio links with nonlinear amplifiers*, IEEE Trans. on Commun., vol.45, pp. 421–428, April 1997, and A. N. D'Andrea, V. Lottici and R. Reggiannini, *RF power amplifier linearization through amplitude and phase predistortion*, IEEE Trans. on Commun., vol. 44, pp. 1477–1484, November 1996 and references therein). The general principle is to pass the transmitted signal through a non-linearity means that attempts to invert the AM/AM and AM/PM HPA characteristics in order to reduce its overall impact. Although the approach may lead to some noticeable improvement, in particular for high SNR operation points or higher constellation orders, the main drawback consists in the need to operate on the modulated signal prior to amplification. Furthermore, pre-distortion techniques typically entail a reduction in effective HPA power, that is tantamount to saying that it is of importance for satellite systems. Finally, this approach generates an unwanted increase of out-of-band emissions.

Therefore, in accordance with an aspect of this invention there is proposed a new and simple technique just requiring the modification of the APSK signal constellation. The key observation leading to this proposal is that a reduction in the distortion can be obtained by changing the complex-valued constellation, instead of the transmitted signal. In fact, the non-linearity has two major effects:

The creation of inter-symbol interference at the receiver, due to the non-matched filter receiver. This issue is to be tackled mainly with an equalizer at the receiver, or at the transmitter by means of shaping pulse optimization.

The distortion of the very constellation points, which are mapped to a different point. If the distortion were linear, this would amount to a shift in the constellation, recoverable with phase and amplitude estimation. For a non-linear case, the relative positions of the constellation points change. This can be reduced by pre-compensation at the transmitter, or post-compensation at the receiver.

Starting with the amount of pre-compensation to be included in the modulator, it is quite easy to see that, thanks to the double-ring constellation properties, one can easily pre-compensate for the main HPA constellation geometry distortion effects by simply modifying the generated signal $\rho$ and $\Phi$ parameters. This avoids the use of non-linear pre-compensation devices after the modulator acting on the transmitted signal. Taking into account the AM/AM and AM/PM HPA characteristics it is easy to see that a good approximation to the original signal constellation geometry can be re-obtained by artificially increasing the $\rho$ factor in the modulator. This assumes one sample per symbol after the matched filter and neglects inter-symbol interference effects. In this way the optimal value of $\rho$, for instance 2.7 for 4+12-APSK, is re-established at the demodulator side. The outer ring phase phi is also de-rotated to counteract the HPA AM/PM distortion effects. If required, the pre-compensation parameters can be modified to track possible HPA characteristic aging effects.

The major advantage of this approach is that for a broadcasting system the compensation only affects the central (ground) modulator and does not require any modification of the (many) distributed demodulators.

Figure 7:
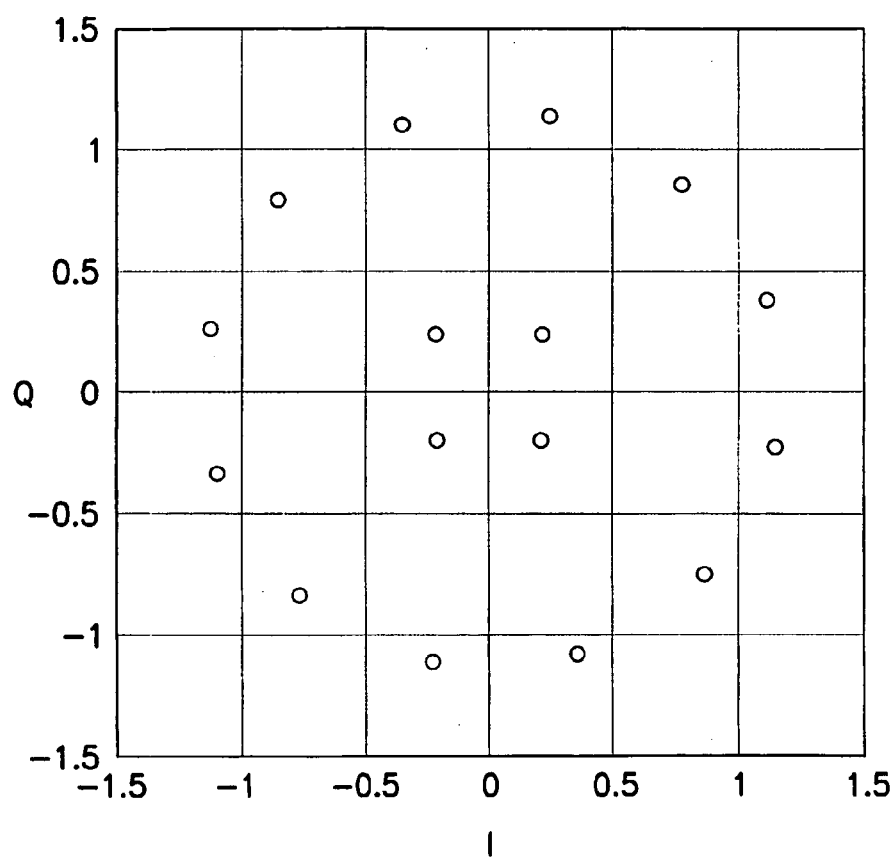
FIG. 7 illustrates an example of pre-distorted signal constellation.

The new constellation points $\check{Z}'$ follow equation (1) with new radii $R_1'$ and $R_2'$ such that $F(R_1') \approx R_1$ and $F(R_2') \approx R_2$. Concerning the phase it is possible to pre-correct for the relative phase offset introduced by the HPA between inner and outer ring by simply changing the relative phase shift by $\phi' = \phi + \Delta\phi$ with $\Delta\phi \approx \Phi(R_2') - \Phi(R_1')$. Exact calculation of the pre-distorted constellation parameters can benefit from the technique described by R. De Gaudenzi and M. Luise (*Design and Analysis of an All-Digital Demodulator for Trellis Coded* 16-*QAM Transmission over a Nonlinear Satellite Channel*, IEEE Trans. on Comm., Vol. 43, No. 2/3/4, February/March/April 1995, Part I) to compute the constellation center of mass. This can be readily implemented in the digital modulator by simply modifying the reference constellation parameters $\rho'$, $\phi'$ with no hardware complexity impact or out-of band emission increase at the modulator output. On the other side this allows to shift all the compensation effort onto the modulator side allowing the use of an optimal demodulator/decoder for AWGN channels even when the amplifier is operated very close to saturation An example of a pre-distorted constellation for a TWTA IBO of 2 dB is shown in FIG. 7.

The pre-compensated signal expression at the modulator output is then:

$$\check{s}_{TX}^{pre}(t) = \sqrt{P \sum_{k=-\infty}^{\infty} \check{Z}(k) g_T(t - kT_s)} \quad (8)$$

Figure 8:
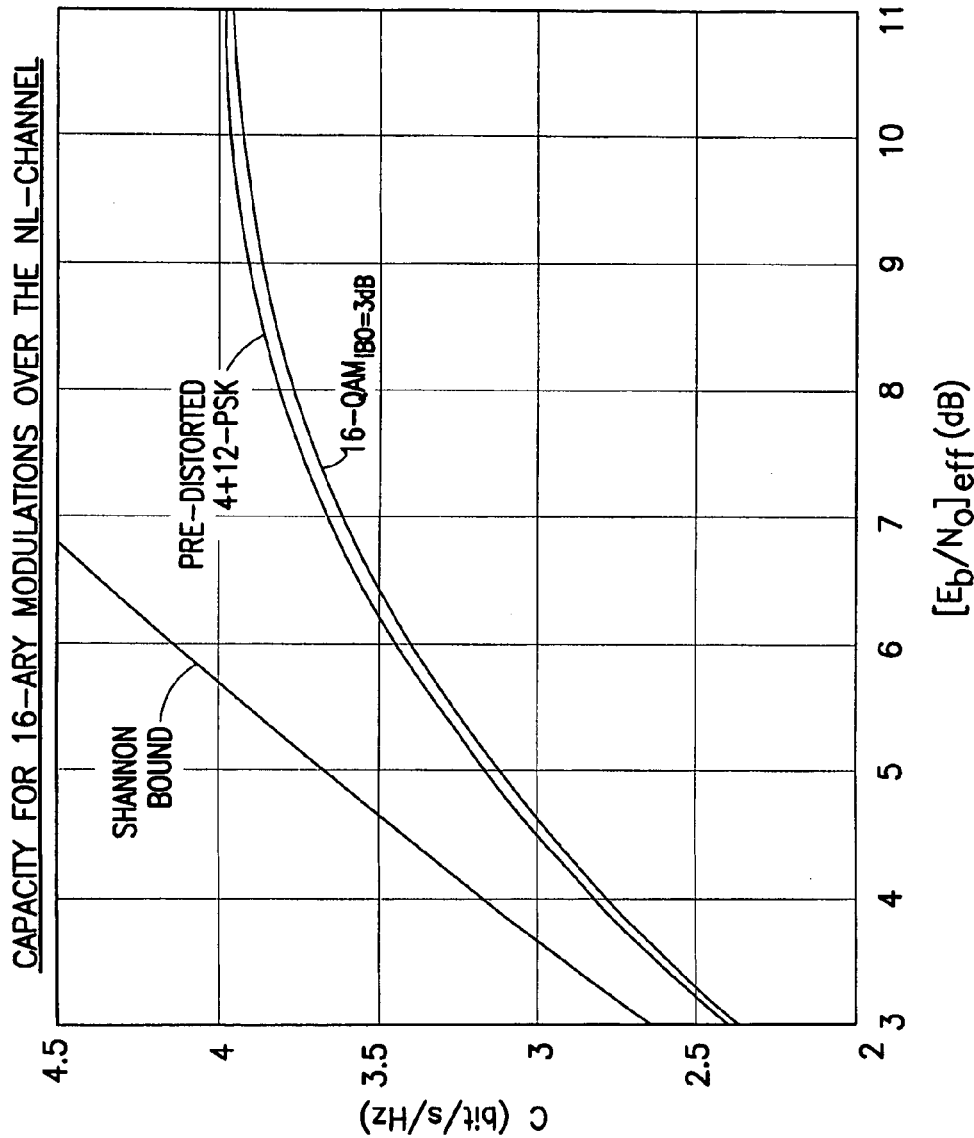
FIG. 8 illustrates the variation of the AWGN (Additive White Gaussian Noise) non linear channel capacity for different modulation schemes.

The channel capacity of a pre-compensated double-ring 4+12-APSK scheme versus the classical coded 16-QAM scheme has been theoretically evaluated. FIG. 8 shows the results for a pre-compensated and distorted 4+12-APSK, $\rho=3.7$ (IBO=2 dB) constellation and the distorted 16-QAM as a function of $E_b/N_0$. Capacity plots have been obtained neglecting residual ISI effects due to the band-limited signal and the OBO losses, that will further advantage 4+12-APSK. Nonetheless the theoretical advantage of the proposed new modulation format over a non-linear channel is clear.

Satellite channel distortion can also be compensated by post-compensation techniques to recover losses at the demodulator side through decoder metric computation and/or non-linear equalization (R. De Gaudenzi and M. Luise, *Design and Analysis of an All-Digital Demodulator for Trellis Coded* 16-*QAM Transmission over a Nonlinear Satellite Channel*, IEEE Trans. on Comm., Vol. 43, No. 2/3/4, February/March/April 1995, part I) which is incorporated herein by reference.

The effect of satellite channel memory-less distortion upon the transmitted undistorted 16-QAM signal results first in a decrease of the distances between the constellation points due to amplifier saturation, together with a differential rotation of the inner points of the constellation with respect to the outer ones, due to AM/PM conversion and, second, in a spreading of the constellation points into small clusters, due to a sort of "non-linear inter-symbol interference" caused by the filtering of the distorted signal.

Ad-hoc decoder metric computation has been disclosed in *Design and Analysis of an All-Digital Demodulator for Trellis Coded* 16-*QAM Transmission over a Nonlinear Satellite Channel*, R. De Gaudenzi and M. Luise, IEEE Trans. on Comm., Vol.43, No.2/3/4, February/March/April 1995, part I. Signal set partitioning techniques employed by trellis codes inherently counteract the phenomenon of signal distance reduction. However, as suggested in the reference mentioned above, this detrimental effect can be further diminished by properly adjusting the metric ROM in the Viterbi decoder. With the aid of this technique it is also possible to take into account the differential phase shift of the constellation points. A simple strategy to modify the branch metric calculation is that of pre-computing (for a fixed amplifier OBO) the 16 centroids of the 16 different clusters corresponding to each transmitted symbol. The branch metric computer, instead of evaluating the Euclidean distance between the received signal sample (after phase/amplitude correction) and the undistorted symbols $\alpha_i + jb_i$, derives the various distances with respect to the 16 cluster centroids associated to the corresponding constellation point.

The major drawback of this approach, is that non-linearity compensation should be made adaptive at the demodulator to follow drifts of the amplifier characteristics due to aging or short-term thermal stresses or uplink power level variations (fading etc.). Also, centroid computation (and hence metric computer reconfiguration) is not so easily accomplished, as it will require the off-line centroid computation.

This operation is impractical, as it will require either very high SNR, or equivalently very low bit error probabilities, or the transmission of a very long modulated preamble.

Another approach for compensating the satellite channel distortion consists in using non-linear adaptive equalization means at the demodulator side. This method however does not provide any significant improvement over nonlinear channels. Adaptive non-linear equalization is claimed to provide considerable advantages for PSK modulations in terms of MSE reduction by estimating the channel Volterra series coefficients. In particular, it is hinted that the adoption of a non-linear equalizer allows reducing the optimum operating IBO, thus improving the HPA utilization, by reducing the inter-symbol interference generated by the non-linearity. However, it is expected that this advantage will be more pronounced for 16-QAM than for double-ring APSK with pre-compensation, as this is already very close to the optimal linear channel performance.

Furthermore experimental results reported so far are limited to the MSE improvement for an uncoded signal. It is quite obvious that the noticeable MSE non-linear equalizer improvement will be somewhat masked by the low SNR operating point typical of powerful encoded transmission. The conjecture about the limited improvement provided by a non-linear equalizer for heavily coded modulation will be substantiated in the following.

Figure 9:
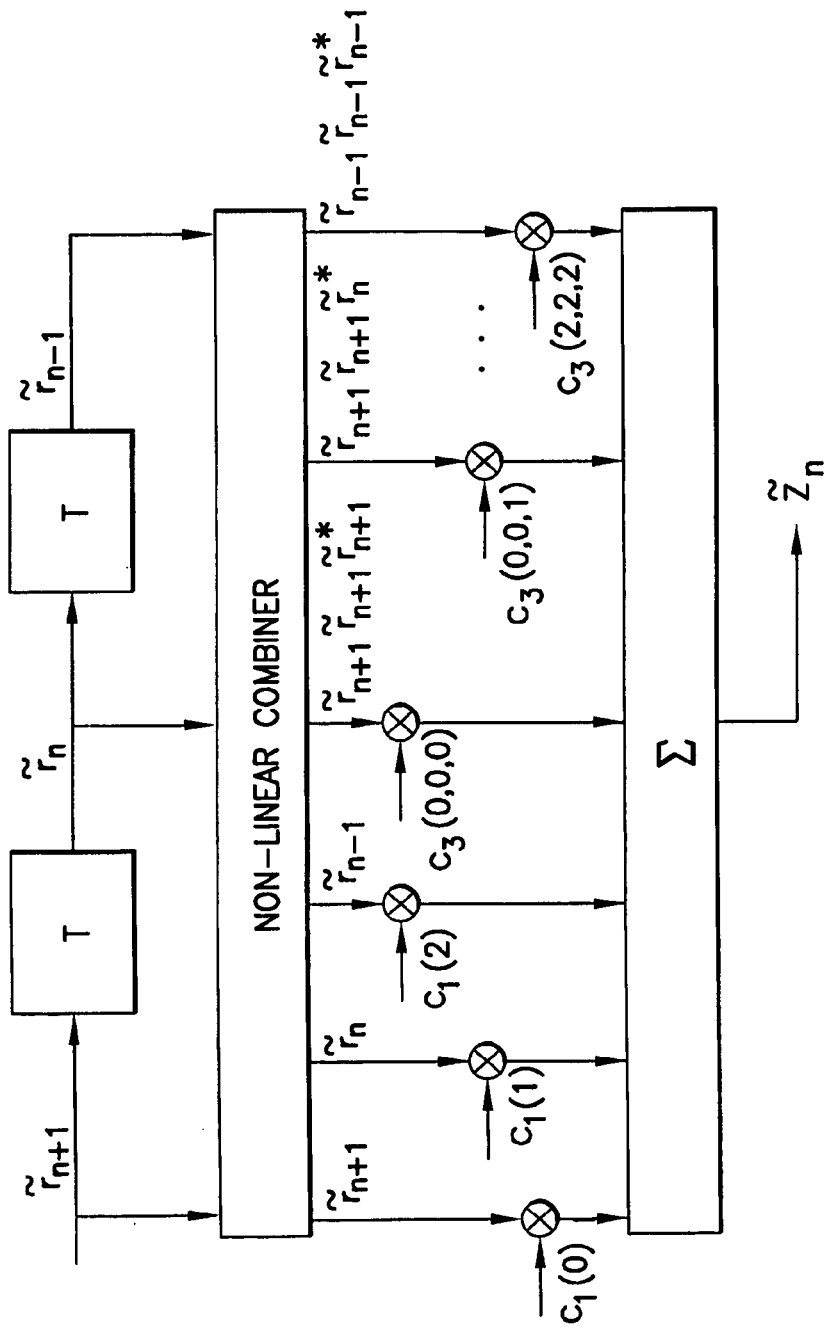
FIG. 9 represents a block diagram of a third-order non linear equalizer.

The structure of the LMS non-linear equalizer is shown in FIG. 9. It can be observed that compared to the conventional linear tapped delay, the NL equalizer features a increased number of taps due to the additional tap coefficients required by the non-linear terms generated by the non-linear combiner. The number of equalizer taps N{taps} is given by the following equation:

$$N_{taps} = \sum_{i=1}^{(N_{ord}+1)/2} N_{TDL}^{2i-1} \quad (9)$$

where $N_{TDL}$ are the number of taps of the tapped delay line (maximum channel memory) and $N_{ord}=2M+1$ with M integer is the equalizer order, i.e. the maximum non-linearity order that is compensated.

Denoting as $\check{r}_n$ the complex signal samples after symbol matched filter and symbol rate decimation, the non-linear equalizer output sample $\check{Z}_n$ is a Volterra series:

$$\check{Z}_n = \sum_{k_1=0}^{N_{TDL}-1} \check{r}_{n-k_1} c_1^n(k_1) + \sum_{k_1=0}^{N_{TDL}-1}\sum_{k_2=0}^{N_{TDL}-1}\sum_{k_3=0}^{N_{TDL}-1} r_{n-k_1} r_{n-k_2} r_{n-k_3}^* c_3^n(k_1,k_2,k_3) + \quad (10)$$

-continued $$\sum_{k_1=0}^{N_{TDL}-1} \ldots \sum_{k_{Nord}=0}^{N_{TDL}-1} r_{n-k_1} \ldots r_{n-k_{Nord}}^*(k_1, \ldots, k_{Nord})$$

The adaptive filter coefficients are computed according to the following recursive LMS equation:

$$\check{Z}_n = [c^n]^T y_n \quad (11)$$

$$c^{n+1} = c^n - \alpha(\check{Z}_n - \check{s}_n) y_n^*$$

where the reference signal is the transmitted complex value $\check{s}_n = R(\Psi_n)\exp[j\Psi_n]$ and the following $N_{taps}$-dimensional arrays are defined:

$$c^n = [c_1^n(0), \ldots, c_1^n(N_{TDL}-1), \ldots, c_3^n(0,0,0) \ldots, c_3^n(N_{TDL}-1, N_{TDL}-1, N_{TDL}-1), \ldots, \quad (12)$$

$$c_{Nord}^n(0, \ldots, 0) \ldots, c_{Nord}^n(N_{TDL}-1, \ldots, N_{TDL}-1)]^T$$

$$y_n = r_n, r_{n-1}, \ldots, r_{n-N_{TDL}+1}, r_n r_n r_n^* \ldots, r_{n-N_{TDL}+1} \ldots r_{n-N_{TDL}+1} \ldots r_{n-N_{TDL}+1}]^T$$

where $c^n$ is the equalizer coefficient array and $y_n$ represents the non-linear combiner values. Note that the exact $\check{s}_n$, that is the reference complex signal samples, are available by exploiting the known part of the frame such as the unique word (UW) bits. Considering that the channel is almost static (or very slowly varying) the proposed data-aided equalization exploiting a limited part of the frame is not an issue as high adaptation speed is not required.

For correct equalizer operation it is assumed that the UW synchronization has been successful accomplished. Despite the equalizer's capability to remove phase errors as well, separate carrier phase synchronization in front of the equalizer has been kept in order to reduce the equalizer's stress to input signal phase errors. In fact, the low adaptation speed of the non-linear equalizer may not be matched to the phase tracking speed requirements. Furthermore the proposed phase recovery scheme(s) can be easily implemented as a second order loop thus allowing for absorbing possible residual input carrier frequency errors. This feature cannot be supported by the LMS non-linear equalizer, which only allows a first order loop implementation.

The performance of the 16-APSK modulation of this invention is analysed in the following both for Trellis-coded modulation (TCM) and turbo coded versions of the same double-ring APSK scheme.

Figure 10:
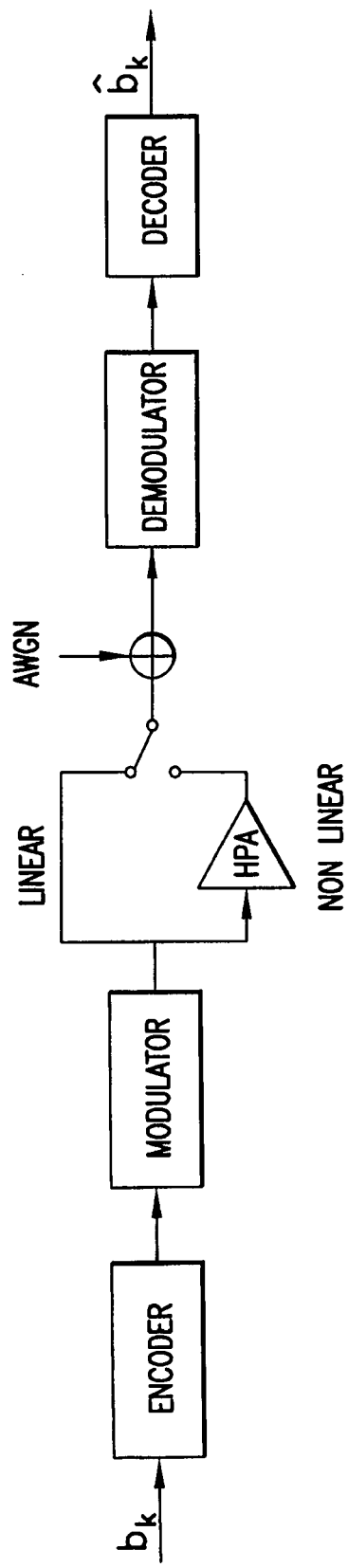
FIG. 10 represents a block diagram of a system model according to the invention.

The overall system model used for simulation of the invention is illustrated in FIG. 10. The system comprises a coder (TCM or turbo) followed by a 16-ary modulator and a channel. The channel is either a linear or a non-linear device (HPA) followed by an Additive White Gaussian noise (AWGN) generator. The resulting signal enters the demodulator performing baseband signal conversion, symbol matched filtering, channel estimation (amplitude, clock timing, carrier phase). The soft I-Q symbol samples are then passed to the decoder, which performs the estimate of the transmitted bits.

For simplicity in the following, it is assumed a simple transmission chain composed of a digital modulator, square root raised cosine band-limiting (with roll-off factor 0.35) and a high power amplifier characterized by a typical AM/AM and AM/PM Ka-band TWTA characteristic. This scheme is also representative of a satellite bent-pipe transponder for which the uplink noise is negligible compared to the downlink.

Due to the tight signal band-limiting the impact of the satellite output analogue filter is negligible. The satellite channel is then simply represented by a memory-less non-linearity that is characterized by the following two functions:

$$F(A) \text{ AM/AM characteristic} \quad (13)$$

$$\Phi(A) \text{ AM/PM characteristic} \quad (14)$$

where A is the instantaneous input signal amplitude. Assuming that the HPA input signal complex envelope is:

$$\tilde{s}_{TX}(t) = \tilde{s}_{TX}(t) | \exp[j\Phi_{sTX(t)}] \quad (15)$$

then the HPA output $\tilde{s}_{HPA}(t)$ can be expressed as:

$$\tilde{s}_{HPA}(t) = F(|\tilde{s}_{TX}(t)|) \exp[j(\Phi_{sTX(t)} + \Phi(|\tilde{s}_{TX}(t)|))] \quad (16)$$

Introduced here is the parameter $[E_b/N_0]_{sat}$ defined as the ratio between the transmitted energy per bit when the amplifier is driven at saturation by a continuous wave (CW) carrier and the noise power spectral density {S. Benedetto, E. Biglieri and V. Castellani, *Digital Transmission Theory*, Prentice Hall, 1987).

It is easy to find that the following general relation holds when a digital signal is passed through the HPA driven at a given input back-off (IBO):

$$[E_b/N_0]_{sat} = [E_b/N_0]_{inp}(IBO)(\text{dB}) + OBO(IBO)(\text{dB}) \quad (17)$$

It means that the effective demodulator input $[E_b/N_0]_{inp}$ is reduced by the output back-off (OBO) with respect to the one potentially available for a system operating with a single constant envelope signal operating at HPA saturation. At the same time the demodulator performance is degraded with respect to an ideal linear AWGN channel by an amount D(IBO)(dB) (dependent on the HPA distortion and hence on the IBO/OBO) so that the effective demodulator input $E_b/N_0$ named $[E_b/N_0]_{eff}$ is given by:

$$[E_b/N_0]_{sat} = [E_b/N_0]_{eff}(\text{dB}) + OBO(IBO)(\text{dB}) + D(IBO) (\text{dB}) \quad (18)$$

This equation is very useful to optimize the performance of a non linear digital transmission system as it allows to optimize the HPA IBO (and/or OBO) that minimizes $[E_b/N_0]_{sat}$. The optimal operating point represents the best trade-off between the increasing power loss (OBO) related to the increasing IBO and the reduction of the distortion ($D$) due to the improved linearity experienced with an increasing IBO.

In the following the performance of the 16-APSK digital modulation scheme will be discussed on the basis of simulations performed using the double-ring 4+12-APSK constellation described earlier herein as compared to the conventional 16-QAM scheme.

Figure 11:
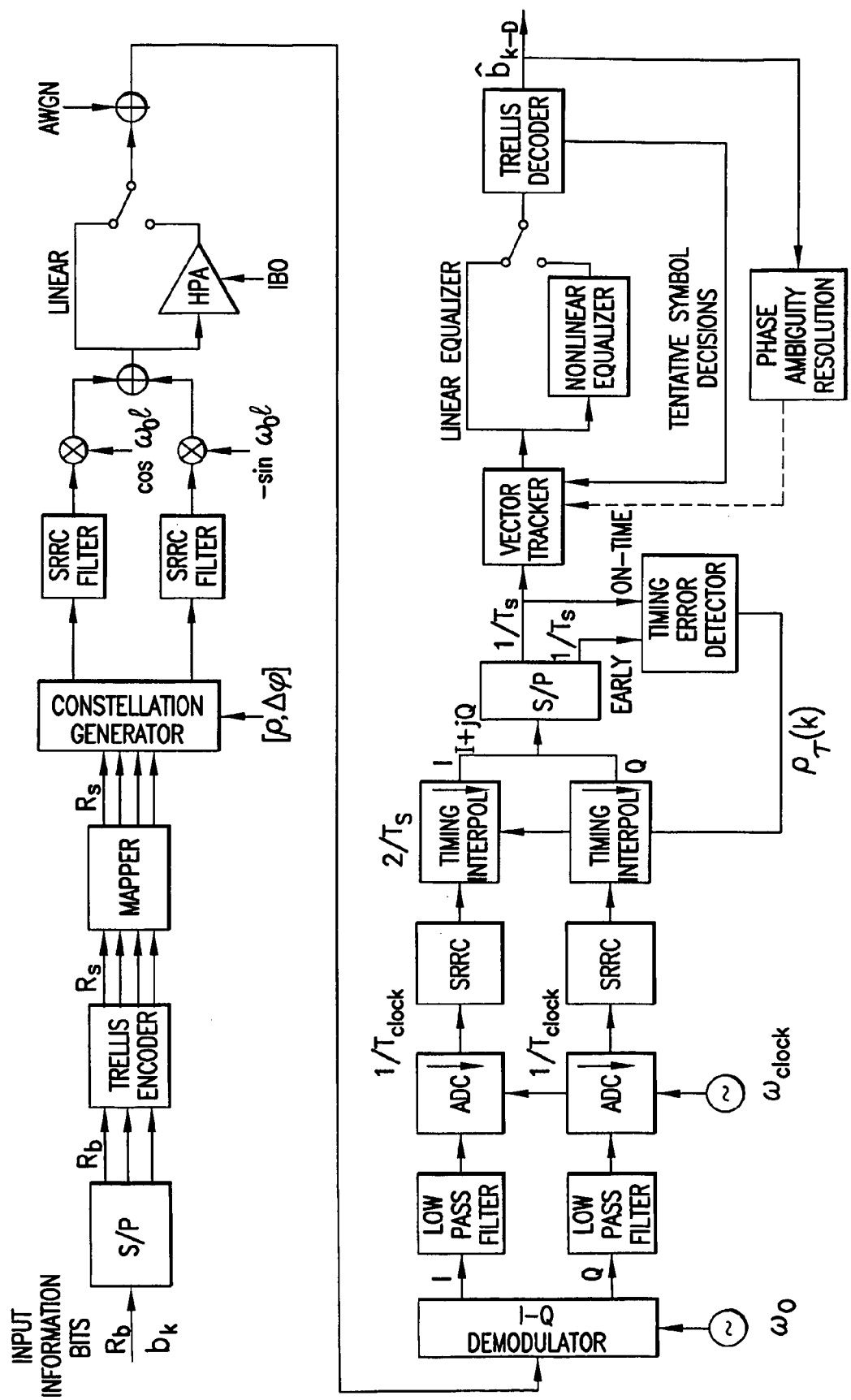
FIG. 11 represents a block diagram of a trellis-coded end-to-end modulation system according to the invention.

The performance of the 4+12-APSK modulation scheme will first be considered when used with trellis coding. FIG. 11 shows a block diagram of the end-to-end TCM system under consideration. The binary information data bits $b_k$ at rate $R_b$ enter a serial-to-parallel device S/P generating three parallel streams at rate $R_b' = R_b/3$. The rate r=3/4 trellis coder generates four parallel binary symbol streams at rate $R_s = R_b'/(r \log_2 M)$ that are mapped through an Ungerboeck mapper to the 16-ary constellation generator. The I-Q multilevel digital pulse stream is then passed to the two baseband SRRC filters and I-Q modulated at RF. In case of the non-linear channel, the passband real signal then drives the HPA. Addictive White Gaussian Noise AWGN representative of the downlink satellite channel is then added.

At the demodulator side, the passband input signal is I-Q demodulated in demodulator to baseband using standard analogue or digital techniques. The I-Q streams are then asynchronously sampled at $N_s = T_s/T_{clock}$ samples/symbol. In practical implementations the number of samples/symbol $N_s$ depends on the anti-aliasing filter contained in the I-Q demodulator front-end. These samples, assumed for simplicity to be not quantized, are then passed to the receiver SRRC matched filters. The SRRC filter outputs are then subsampled at two samples per symbol (on-time and early) by a digital interpolator (F. M. Gardner, *Interpolation in Digital Modems—Part I: Fundamentals*, IEEE Trans. on Comm., Vol. 41, No. 3, March 1993) driven by the timing error detector unit. The output symbol stream is then split into on-time and early samples through a simple S/P converter. Both streams are used to derive the timing error information. The on-time one sample per symbol stream then enters the digital vector tracker performing amplitude and phase estimation. It is assumed here that there is no need for a frequency estimator to help the phase estimator. In any case, the QAM frequency estimators are applicable to this case. In case the non-linear equalizer is activated, it is inserted prior to the TCM decoder that represents the last demodulator block. Tentative symbol decisions are generated to help the digital vector tracker. The ambiguity resolution block takes care of resolving possible phase estimator ambiguities.

The overall BER performance of the demodulator for the known 16-state rate ¾ trellis code (S. Pietrobon, R. H. Deng, A. Lafanechere, G. Ungerboeck and D. J. Costello Jr., T C Multidimensional Phase Modulation, IEEE Trans. on Information Theory, Vol. 36, N.1, January 1990) was successfully compared to the theoretical bound derived by means of the so-called distance-spectrum approach introduced by M. Rouanne and D. J. Costello, {*An Algorithm for Computing the Distance Spectrum of Trellis Codes*, IEEE Jour. On Sel. Areas in Comm., Vol. 7, N. 6, August 1989). The performance of the 16-QAM demodulator in the linear channel, including amplitude, timing and phase estimation subsystem degradations, is very close to the analytical upper bound in AWGN. For the 16-state code the coding gain of coded 16-QAM with respect to uncoded 8-PSK at $P_e = 10^{-5}$ is about 4.4 dB.

TABLE 1

Selected "r = ¾" trellis codes for 16-QAM

| No. state | Polynomial 0 | Polynomial 1 | Polynomial 2 |
|---|---|---|---|
| 16 | 23 | 04 | 16 |
| 32 | 41 | 06 | 10 |
| 64 | 101 | 016 | 064 |

Concerning the operating point for the TCM, it should be remembered that for quasi-error free (QEF) performance (e.g. BER on the order of $10^{-10}$) the inner decoder BER should be on the order of $2.10^{-4}$ (M. Cominetti and A.

Morello, *Digital Video Broadcasting over Satellite (DVB-S): a system for broadcasting and contribution applications*, Int. Jour. on Satellite Commun., 2000, No. 18, pp. 393–410, assuming that an RS (188,204) code with proper interleaving is adopted as outer code. The selected 16 state optimal trellis code for 16-QAM provides a performance very close to that of the 64 state pragmatic trellis code selected for the Digital Video Broadcasting DVB-DSNG standard.

The problem of digital synchronization for TC-QAM has been addressed in the past. In particular, a pragmatic solution to the problem of timing, amplitude and phase estimation for TC-16QAM signals is disclosed in *Design and Analysis of an All-Digital Demodulator for Trellis Coded 16-QAM Transmission over a Nonlinear Satellite Channel*, R. De Gaudenzi and M. Luise, IEEE Trans. on Comm., Vol. 43, No. 2/3/4, February/March/April 1995, part I) provides a pragmatic solution. The approach followed was to use a robust Non Data-Aided (NDA) scheme proposed by F. M. Gardner, {*A BPSK/QPSK Timing-Error Detector for Sampled Receivers*, IEEE Trans. on Commun., Vol. COM-34, N. 5, May 1986) for timing recovery. For amplitude estimation a NDA algorithm is used for the acquisition phase, switching to a Decision-Directed (DD) scheme after lock.

The synchronization and non-linearity pre-compensation approach, although originally intended for TC 16-QAM, can also be considered for the double-ring APSK modulation. However, the proposed pre-compensated 4+12-APSK allows to avoid post compensation at decoder metric computation level. A comparison between the two options will be made later herein.

For the sake of completeness we summarize in the following the channel estimation algorithms applicable to the TC-APSK modulation from *Design and Analysis of an All-Digital Demodulator for Trellis Coded 16-QAM Transmission over a Nonlinear Satellite Channel*, R. De Gaudenzi and M. Luise, IEEE Trans. on Comm., Vol.43, No. 2/3/4, February/March/April 1995, part I.

In order to ease symbol-timing acquisition an NDA baseband clock recovery scheme (F. M. Gardner, *Demodulator Reference Recovery Techniques Suited for Digital Implementation*, Final Report, Gardner Research Company, Palo Alto, Calif., August 1988, ESA/ESTEC Contract N. 6847/86/NL/DG) was applied. Although originally derived for BPSK and QPSK modulations, it was found that it works well with more general QAM schemes. Extraction of the k-th normalized sampling epoch $\epsilon_k$ is performed recursively via the following closed-loop equation:

$$\epsilon_\tau(k+1) = \epsilon_{96}(k) - \gamma_\tau \epsilon_\tau(k) \qquad (19)$$

where $\epsilon_\tau(k)$ is the Timing Error Detector (TED) function $$\epsilon_\tau(k) = Re\{\breve{r}_k^*[\breve{r}_{k+1/2} - \breve{r}_{k-1/2}]\} \qquad (20)$$

As is apparent, the error detector signal is obtained using the on-time interpolated sample $\breve{r}_k = \breve{r}[(k+\epsilon_k)T]$ and the late/early samples $\breve{r}_{k+1/2}$ and $\breve{r}_{k-1/2}$ shifted by half the symbol time. The updating step-size gamma $\gamma_\tau$ is related to the equivalent one-sided loop noise bandwidth $B_{L\tau}$ as follows:

$$\gamma_\tau = 4 B_{L\tau} T_S / A_\tau (1 + 2 B_{L\tau} T_S) \qquad (21)$$

where $A_\tau$ is the slope at the equilibrium point of the average TED characteristic (S-curve).

As the timing discriminator performance is invariant to carrier phase, so that timing information can be extracted without prior acquisition of the carrier recovery loop.

Concerning the Automatic Gain Control (AGC) and carrier phase estimation, it is known that initial acquisition is a crucial topic in the design of a demodulator for TC modulations. Furthermore, in addition to carrier phase estimation for coherent demodulation, a 16-QAM signal also needs a precise amplitude adjustment so that the branch metrics for the Viterbi decoder can be correctly computed. By observing several demodulator acquisition transients, correct signal amplitude estimation was identified as the primary factor influencing the acquisition time. Consequently, a non-coherent pseudo-ML NDA Automatic Gain Control (AGC) loop whose derivation is reported by R. De Gaudenzi and M. Luise, in *Design and Analysis of an All-Digital Demodulator for Trellis Coded 16-QAM Transmission over a Nonlinear Satellite Channel*, IEEE Trans. on Comm., Vol. 43, No. 2/3/4, February/March/April 1995, part I, was used. As is apparent, the (k+1)-th value of the variable gain $C_{k+1}$ is derived recursively as follows:

$$C_{k+1} = C_k - \gamma_a [C_k |r(k)| - A_1] \qquad (22)$$

where $A_1 = E\{|\breve{r}_k|\}$.

This algorithm is well known to modem designers and is described also in J. A. C. Bingham, *The Theory and Practice of Modem Design*, Wiley, New York, 1988, although its detailed derivation appeared in R. De Gaudenzi and M. Luise, *Design and Analysis of an All-Digital Demodulator for Trellis Coded 16-QAM Transmission over a Nonlinear Satellite Channel*, IEEE Trans. on Comm., Vol. 43, No. 2/3/4, February/March/April 1995, part I.

A fixed time interval can also be allocated to perform this task, since the AGC operates in a blind mode. Once signal amplitude has been properly recovered, for any possible carrier phase error, phase acquisition starts. To this aim, the non-coherent NDA algorithm hands over to the so-called "vector tracker" which is nothing but a Maximum-Likelihood DD joint amplitude/phase tracking loop whose scheme is depicted by R. De Gaudenzi and M. Luise, in *Design and Analysis of an All-Digital Demodulator for Trellis Coded 16-QAM Transmission over a Nonlinear Satellite Channel*, IEEE Trans. on Comm., Vol.43, No. 2/3/4, February/March/April 1995, part I. The detailed derivation of the tracking algorithm is reported therein and leads to the following loop equation for the complex-valued tracking coefficient $\rho_k$:

$$\rho_{k+1} = \rho_k - \gamma_v [\rho_k r(k) - \breve{s}_k] \breve{s}_k^* \qquad (23)$$

$\breve{s}_k = \hat{a}_k + j\hat{b}_k$ is the estimated data symbol, as obtained from zero-delay tentative decisions of the Viterbi decoder.

An important trick to make the acquisition of the vector tracker less uncertain is to ensure "continuity" in the signal constellation amplitude through the takeover between the NDA AGC and the DD tracker. This is easily done by choosing $|\rho_m| = C_m$ at the time m of handover. Instead, the initial phase of $\rho_m$ may be randomly selected. To overcome the problem of phase hang-up related to the vanishing of the S-curves of the phase error characteristic of the vector tracker with coded signals, one can resort to a trial-and-error technique based on survivor metric monitoring, similar to that described by U. Mengali, A. Sandri and A. Spalvieri, in *Phase Ambiguity Resolution in Trellis-Coded Modulation*, IEEE Trans. on Commun., Vol. COM-38, pp.2087–2088, December 1990.

Results of computer simulations performed with the known TOPSIM-IV tool are presented after herein both for the preferred trellis coded 16-APSK constellations and 16-QAM. When not stated otherwise it is assumed that the signal is band-limited in transmission with a square-root raised-cosine filter with roll-off factor 0.35 as for the current Digital Video Broadcasting DVB-S standard. The following demodulator synchronizer settings have been adopted: $\gamma_\alpha=10^{-3}$, $B_{L\tau}=10^{-3}$, $B_{LO}=5.10^{-4}$. All the following results include synchronization losses.

For the AWGN linear channel, the simulated BER curves for trellis-coded 16-QAM and 4+12-APSK have shown that when selecting a non-optimum value for ρ there may result a considerable effect on the system performance. Moreover, for the optimum value of ρ, performance is slightly worse than for 16-QAM, as predicted by the channel capacity discussion.

The impact of the digital synchronizer has been verified by simulation and it has been found to be less than 0.1 dB for a BER of $10^{-4}$ at the output of the trellis decoder.

Although a 16-state code has been assumed as the baseline, some performance improvement can be achieved, at the expense of higher complexity, with a 32-state trellis code. An additional 0.3 dB coding gain provided by the 32-state code should however be traded-off against the complexity increase.

Before discussing the results for the non-linear channel, let us recall the relation between the input back-off (IBO) and the output back-off (OBO). As the input signal is non-constant envelope, the output power cannot be easily estimated by looking at the HPA AM/AM characteristic. For this reason a simulation approach was adopted. In order to optimize the non-linear channel performance, the quantity OBO(IBO)(dB)}+D(IBO)(dB)} should be minimized. Note that the 4+12-APSK pre-compensation is paid for by a slight increase in the OBO at low IBO.

Figure 12:
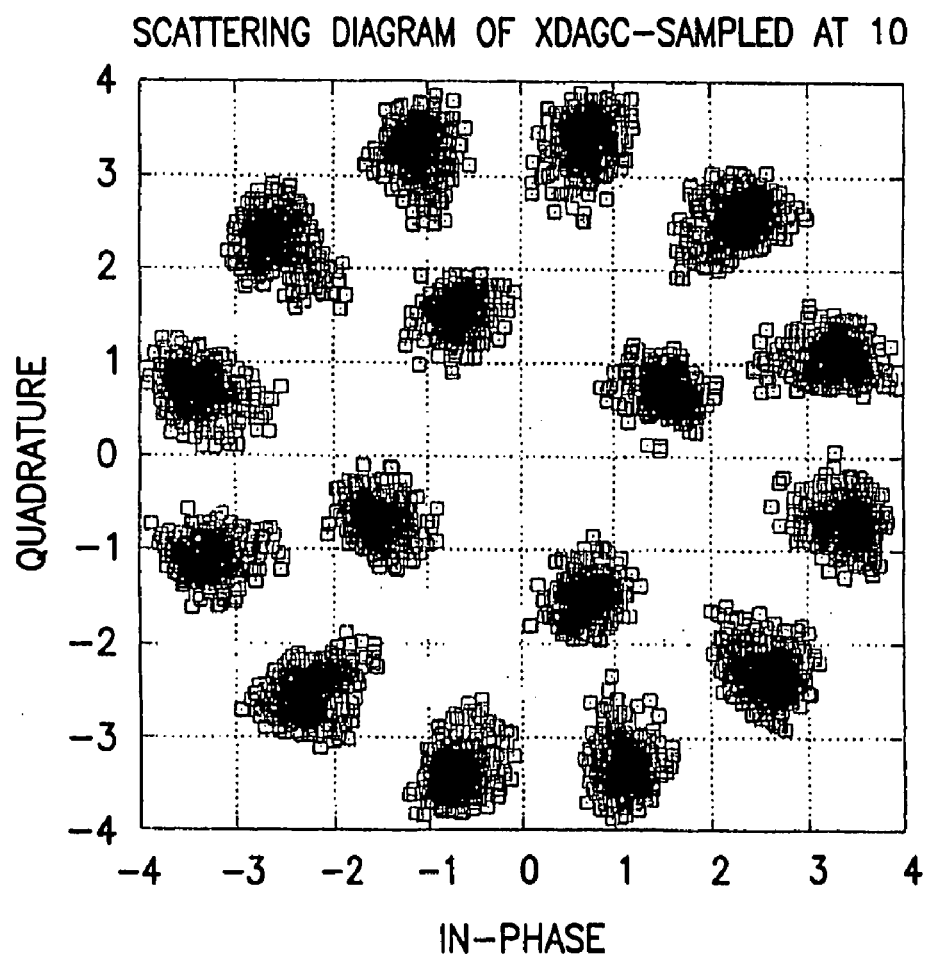
FIG. 12 shows a symbol matched filter output scatter diagram for a 4+12 APSK signal constellation in the non linear channel without pre-compensation.

The capability of the proposed pre-compensation technique for 4+12-APSK is exemplified by the scatter diagram of the signal at the output of the symbol matched filter sampled at the optimum sampling instant. The simulation results for the HPA driven at 2 dB IBO without and with pre-compensation are presented in FIG. 12 while the simulation results with pre-compensation are presented in FIG. 13.

Figure 13:
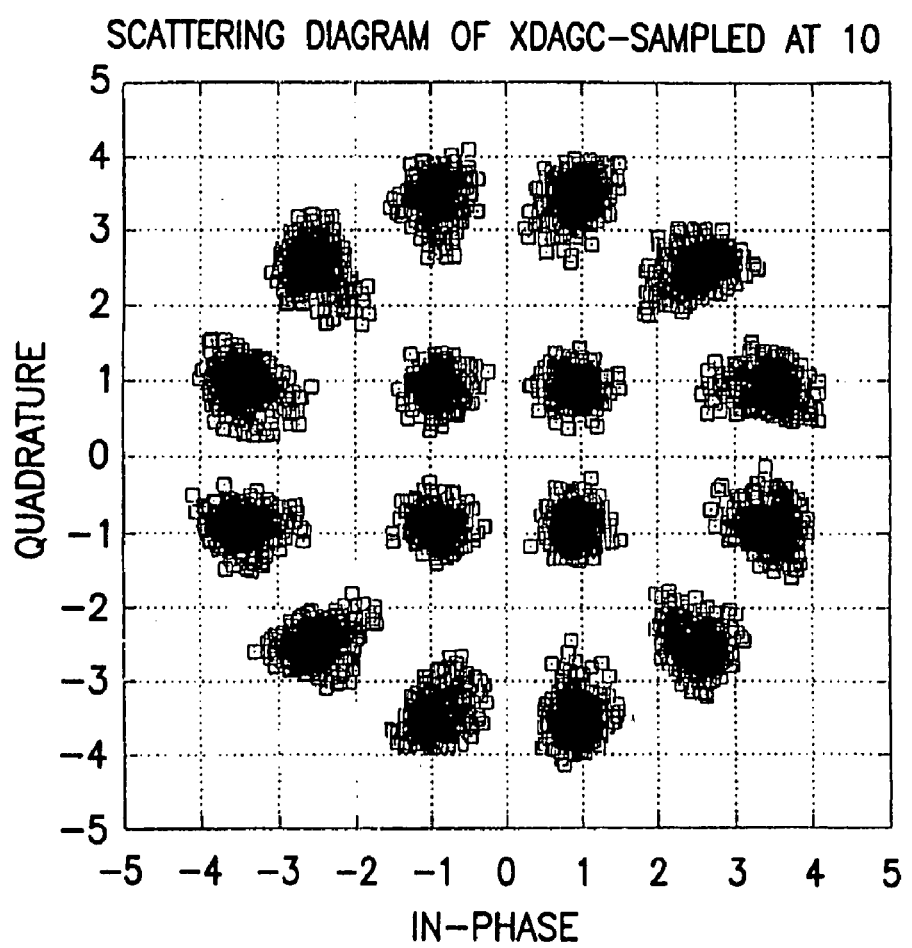
FIG. 13 shows a symbol matched filter output scatter diagram for a 4+12 APSK signal constellation in the non linear channel with pre-compensation.

As expected, without pre-compensation the outer ring in the ideal constellation is close to the inner ring due to the HPA AM/AM compression. The inner ring is rotated by the differential phase rotation caused by the AM/PM HPA characteristic. FIG. 13 shows how the pre-compensation technique allows easy achievement of the desired optimum signal geometry even for very low IBO. The only degradation effect observed in addition to the OBO loss is the cloud of points around the ideal signal constellation due to the inter-symbol interference caused by the HPA distortion of the transmitted signal. However its impact is expected to be modest for a heavily coded modulation.

The optimal 4+12-APSK pre-distortion parameters have been experimentally derived and are summarized in Table 2 below:

TABLE 2

Pre-distortion parameters for 4 + 12 APSK

| IBO (dB) | p (linear) | ΔΦ (deg) |
|---|---|---|
| ∞ | 2.7 | 0 |
| 3 | 3.5 | 24 |
| 2 | 3.7 | 27 |
| 1 | 4.1 | 29 |

The non-linear equalizer has the following parameters: $N_{TDL}=3$, $\alpha_{lin}=10^{-3}$, $\alpha_{nonlin}=10^{-6}$. This corresponds to a third order non-linear equalizer with 30 (3 linear and 27 non-linear) taps.

Figure 14:
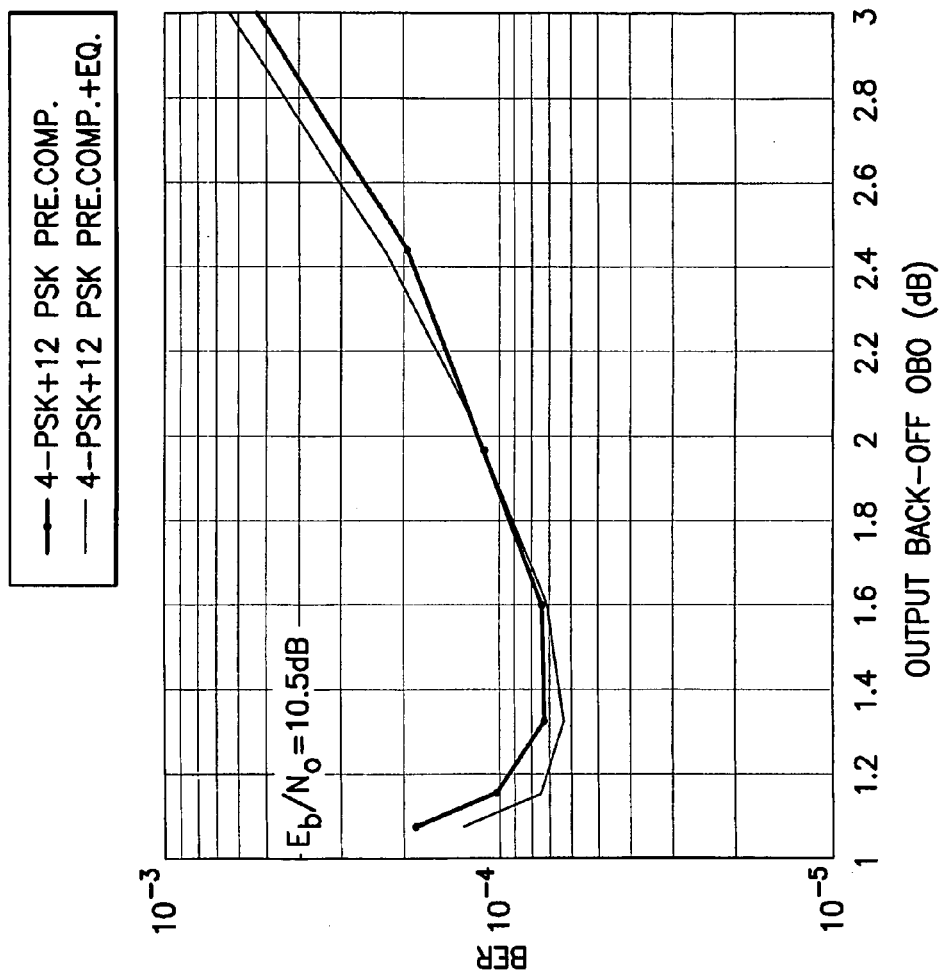
FIG. 14 shows the simulated BER curve versus OBO (output back-off) for trellis-coded 16-QAM and 4+12 APSK modulation schemes in the non linear channel.
Figure 15:
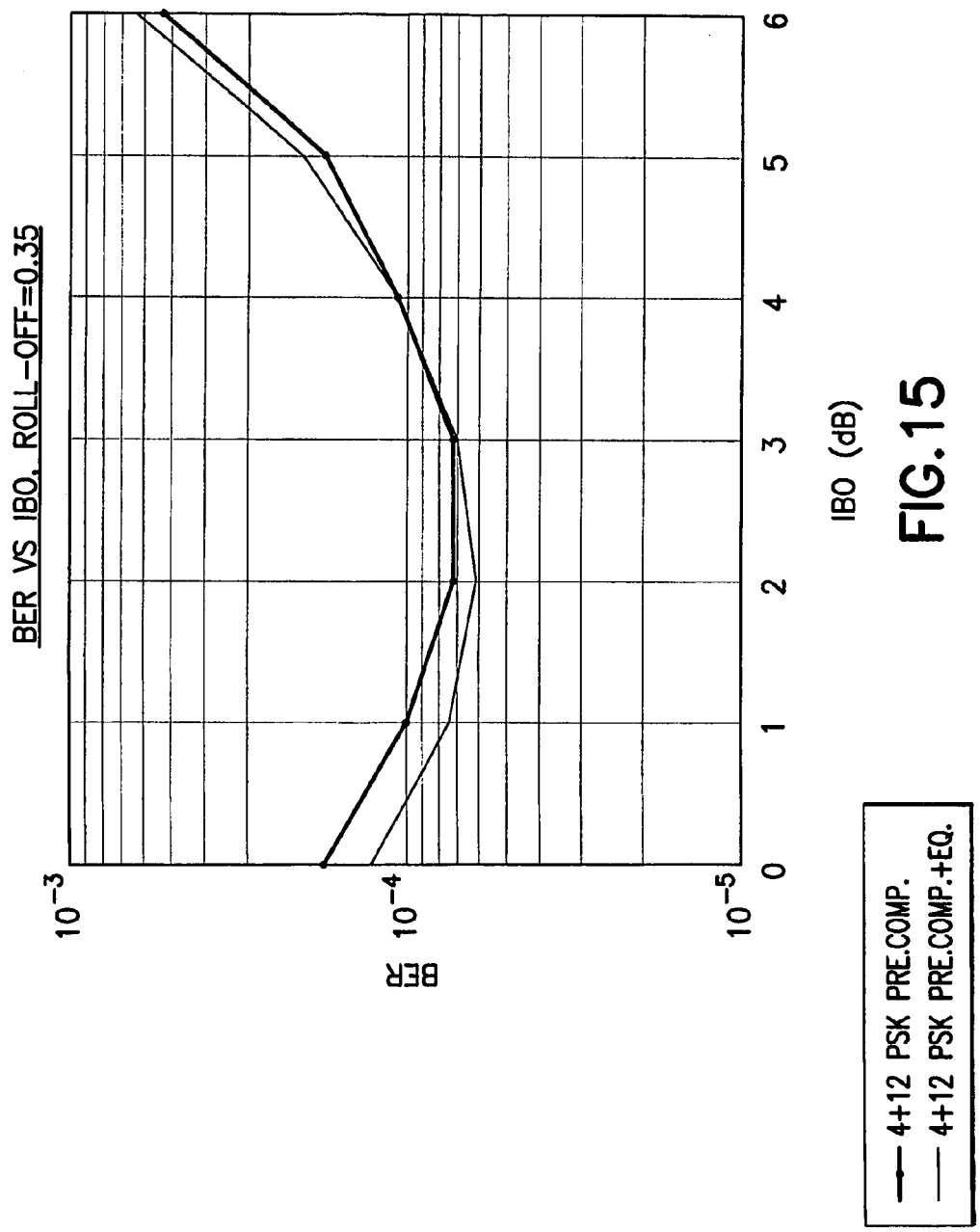
FIG. 15 shows the simulated BER curve versus IBO (input back-off) for 4+12 APSK modulation scheme in the non linear channel.

Following the discussion and the methodology outlined herein, the optimal operating back-off can be derived for a target TCM decoder output BER of around $10^{-4}$. Optimization results as a function of OBO and IBO are shown in FIGS. 14 and 15. Thanks to the pre-compensation and the modulation format selected we can optimally operate close to HPA saturation to the advantage of the system efficiency. It is also visible that the non-linear equalizer allows reducing the optimum IBO by about 1 dB still, but only slightly improves the BER performance.

Taking a BER of $2.10^{-4}$ as reference point, the simulated performance over non-linear channel is shown in Table 3 for various trellis-coded modulation schemes for 16-state TCM. The different modulation schemes illustrated are the following:

1. "Classical" 16-QAM with linear equalization
2. "Classical" 16-QAM with non linear equalization
3. 4+12-APSK with linear equalization
4. 4+12-APSK with non linear equalization
5. 16-QAM with linear equalization and modified TC decoder metrics
6. 16-QAM with non linear equalization and modified TC decoder metrics
7. 4+12-APSK with pre-compensation and linear equalization
8. 4+12-APSK with pre-compensation and non linear equalization.

TABLE 3

Simulated performance over non-linear channel for various trellis-coded modulation schemes 16-state code, IBO = 3dB, roll-off factor = 0.35, $P_R = 2.10^{31\ 4}$

| Scheme | $[E_b/N_0]_{sat}$(dB) | $[E_b/N_0]_{mp}$ |
|---|---|---|
| 1 | 13.1 | 11.5 |
| 2 | 13.0 | 11.4 |
| 3 | 10.9 | 9.3 |
| 4 | 10.7 | 9.1 |
| 5 | 10.5 | 8.9 |
| 6 | 10.4 | 8.8 |
| 7 | 10.0 | 8.4 |
| 8 | 9.85 | 8.35 |

Figure 16:
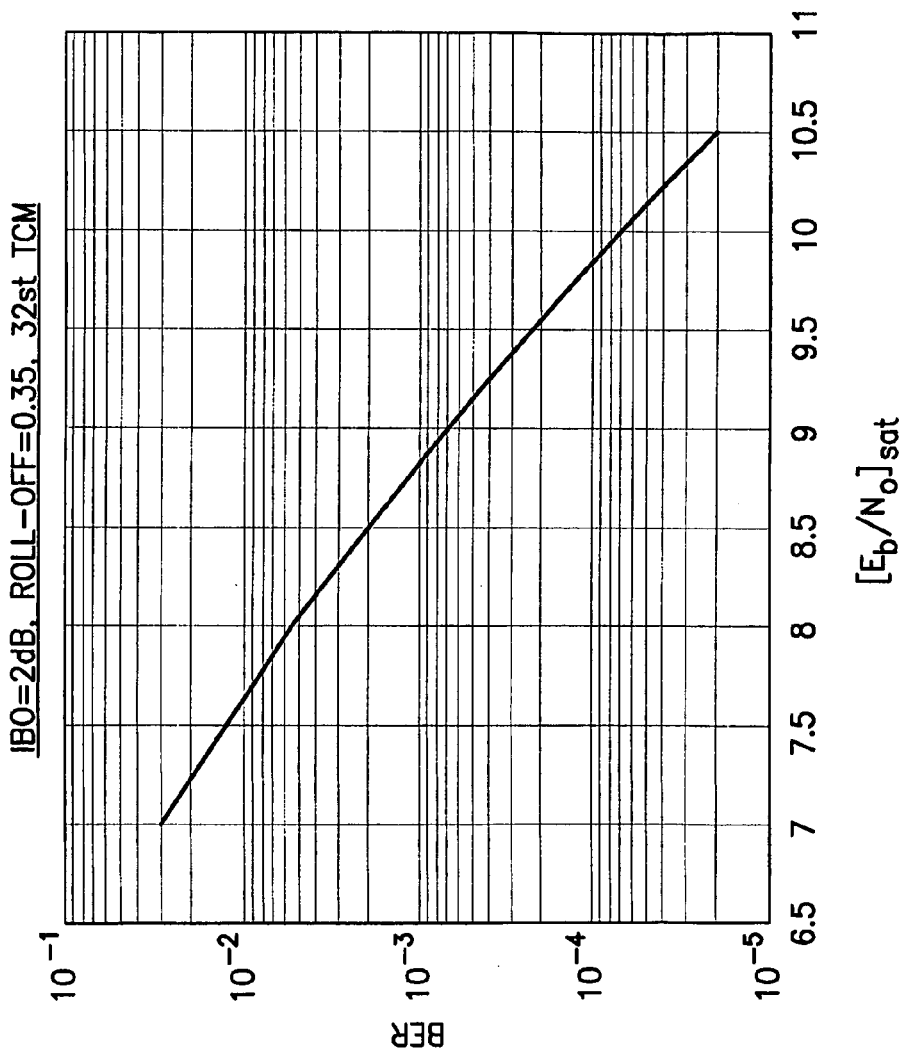
FIG. 16 shows the simulated BER curve for a trellis-coded 4+12 APSK modulation scheme in the non linear channel with a 32-state code.

The proposed 4+12-APSK constellation with pre-compensation achieves a gain of 3.1 dB over conventional 16-QAM with linear complex equalization (amplitude and phase). It can also be observed by using a more powerful trellis code (32-state) and operating at $P_b=2.10^{-4}$, the IBO can be reduced to 2 dB, even without resorting to the non-linear equalizer. The simulated BER in this case is shown in FIG. 16. The value of $[E_b/N_0]_{sat}$ needed for $P^b=2.10^{-4}$ is now reduced to 9.55 dB.

The effect of the SRRC filter roll-off was also observed, showing that the roll-off factor has been relaxed to 0.5, thus reducing signal envelope fluctuations. About 0.75 dB of link impairment reduction was observed by increasing the roll-off from 0.35 to 0.5.

As noted earlier herein, the trellis coded 16-QAM performs slightly better than the double-ring 4+12-APSK scheme proposed over the AWGN linear channel. However, in the non-linear channel, results demonstrate the superior performance of the proposed double-ring APSK modulation. Moreover, the results that have been obtained for 4+12-

APSK, are with the same set partitioning as for the 16-QAM, and therefore, not fully optimized for the proposed 16-APSK modulation scheme. It is important to remember that in order to have a constellation with ρ=2.7 at the receiver, it has been required to pre-distort the signal constellation in amplitude and phase according to Table 2 above.

Notice that at the BER of interest, the performance gap between the optimal pre-compensated 4+12-APSK and its non-optimal counterpart, is much less than that for optimal and non-optimal post-compensated 16-QAM, demonstrating once again the inherent robustness of the proposed schemes over non-linear channels. At the same time, while pre-compensation for 4+12-PSK can still provide about 0.5 dB performance improvement, equalization becomes totally superfluous, reducing the necessary demodulator complexity.

Figure 17:
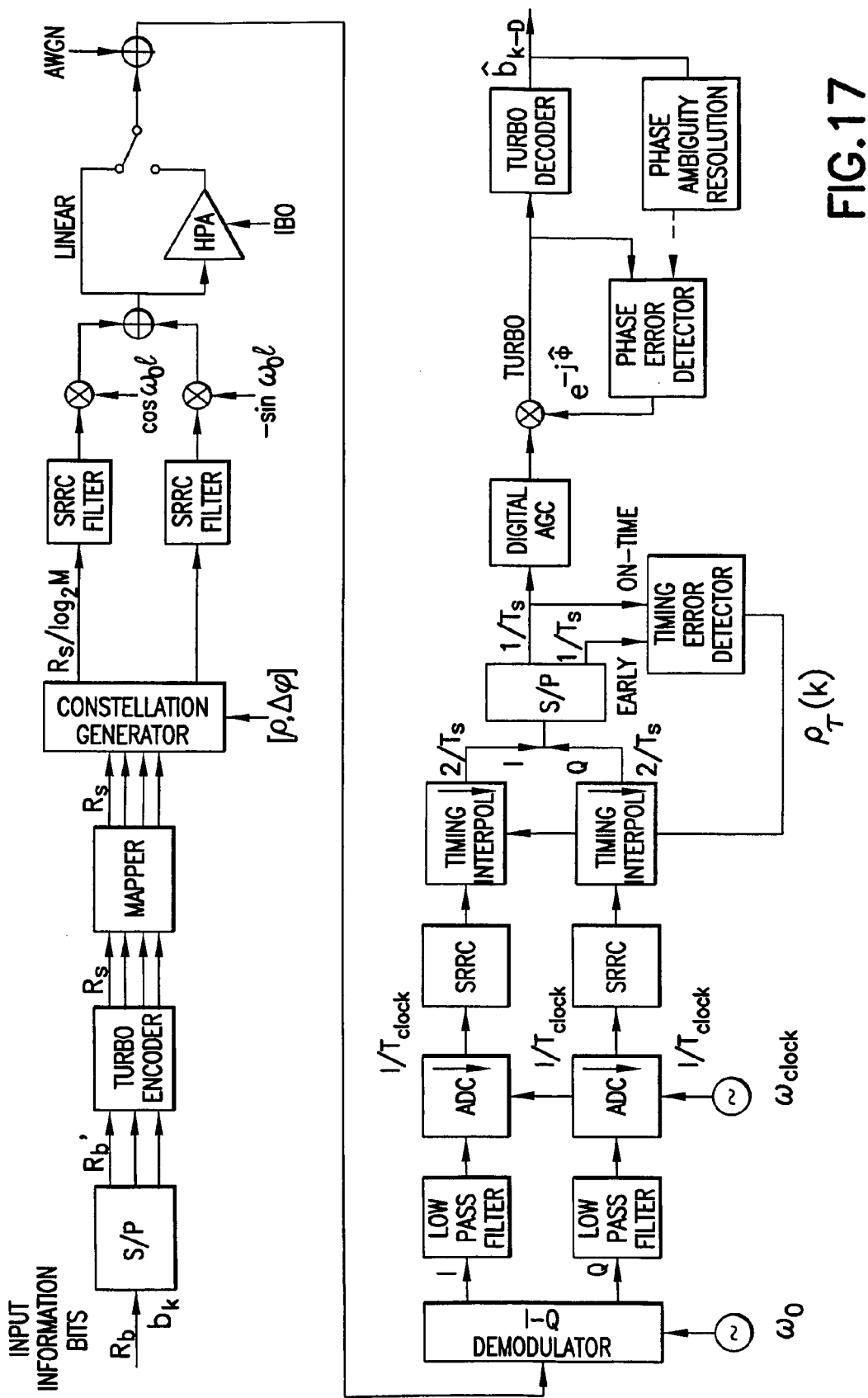
FIG. 17 represents a block diagram of a turbo coded end-to-end modulation system according to the invention.

We shall now consider the performance of the 4+12-APSK-modulation format when combined to the selected turbo-coding scheme. FIG. 17 shows a block diagram of the end-to-end turbo coded system under consideration. The binary information data bits $b_k$ at rate $R_b$ feed a serial-to-parallel device S/P generating three parallel streams at rate $R_b'=R_b/3$. The rate r=3/4 turbo encoder generates four parallel binary symbol streams at rate $R_s=R_b'/(r \log_2'M)$ that are mapped through a Gray mapper to the 16-ary constellation generator. The I-Q multilevel digital pulse stream enters the two baseband SRRC filters and is then I-Q modulated at RF.

In case of the non-linear channel, the passband real signal then enters the HPA. Additive White Gaussian Noise (AWGN) representative of the downlink satellite channel is then added.

At the demodulator side the passband input signal is I-Q demodulated to baseband in demodulator using standard analogue or digital techniques. The I-Q streams are then asynchronously sampled at $N_s=T_s/T\{clock\}$ samples/symbol. In practical implementations the number of samples/symbol depends on the anti-aliasing filter contained in the I-Q demodulator front-end. These samples, which are assumed for simplicity to be not quantized, are then passed to the receiver SRRC matched filters. The SRRC filter outputs are then decimated to two samples per symbol (on-time and early) by a digital interpolator driven by the timing error detector unit. The output symbol stream is then split into the on-time and early samples through a simple S/P converter. Both streams are used to derive the timing error information. The on-time single sample per symbol then enters the digital AGC that performs only amplitude gain adjustment. A dedicated phase error detector is present at the output of the digital AGC. In any case, QAM frequency estimators are applicable to the present case. The turbo decoder block represents the last demodulator block.

The use of turbo codes has an impact on the overall transmission system. The basic question to be answered for code selection is how to combine coding and modulation. The classical approach to this problem (G. Ungerboeck, *Channel Coding with Multilevel Phase Signals*, IEEE Trans. on Information Theory, Vol. IT-28, January 1982) that is used in practice in many systems is to combine coding and modulation in a single entity, Coded Modulation. The previously mentioned TCM is a good example of such a combination. At the receiver side, the demodulation and decoding are also operated jointly. Several attempts at following this road have been undertaken in the turbo coding community with varying degrees of success. In general, the obtained performance is good or even very good, as can be expected from the presence of turbo codes. However, the receiver complexity easily exceeds the practical limits, and most importantly, the simplicity and elegance of the original Ungerboeck approach gets lost in a sea of ad-hoc adaptations.

A somewhat more radical possibility is based on the so-called Bit-Interleaved Coded Modulation (BICM) (see G. Caire, G. Taricco, E. Biglieri, *Bit Interleaved Coded Modulation*, IEEE Trans. on Informat. Theory, vol. 44, pp. 927–947, May 1998). This new coded modulation general scheme (BICM) drops one of the axioms of Ungerboeck's paradigm, i.e. that of combining encoding and modulation in a single entity. It has been shown that the theoretical loss in capacity by doing so is minimal. The analysis shown in that paper states that this loss is small only in the case that Gray mapping is used, although the general validity is somewhat limited by the particular decoding algorithm used. We conjecture, without proof, that the theoretical loss is nil, i.e., a code can be found which approaches capacity for a given modulation, and a given mapping of code bits to modulation symbols.

A key innovation of these schemes, however, is that of realizing that the receiver should operate jointly the demodulation and the decoding parts. This is, in particular, the way the TCM is operated, at least from the receiver side (the modulation symbols are also code symbols, which means in turn that the decoding process can work on the reliabilities of the channel symbols directly, without any loss in performance). In many cases, the code symbols cannot be mapped directly on to modulation symbols, which can be expected to degrade performance. BICM solves this problem elegantly thanks to the presence of an interleaver between the two blocks, allowing the receiver to operate in a quasi-optimal way, even though an additional demodulation-to-bit step is introduced. A last point is that the code can be selected as a good binary code, without any further optimization or search similar to that for codes optimized for set partitioning mapping.

Figure 18:
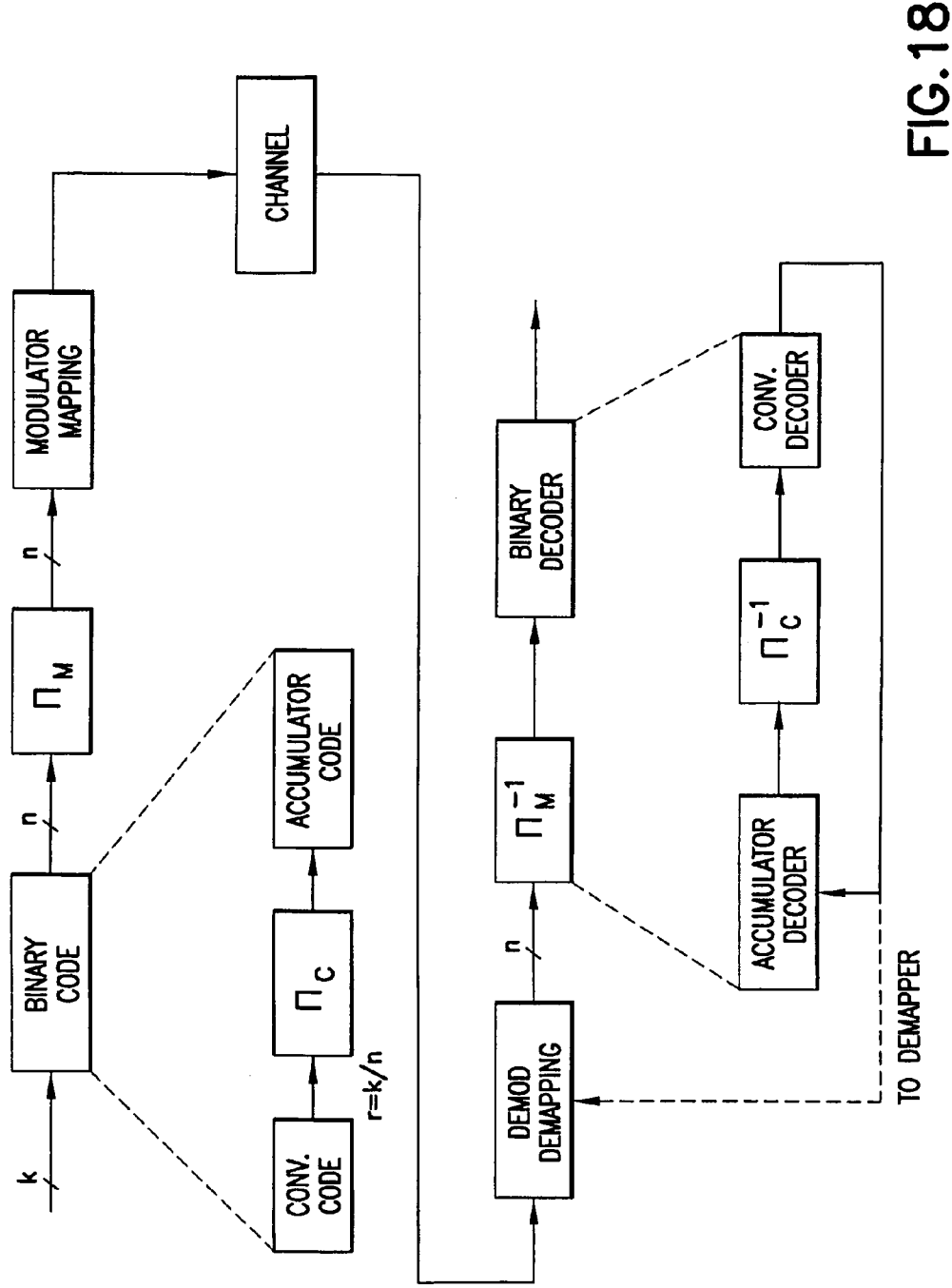
FIG. 18 represents a block diagram of a bit interleaved coded modulation (BICM) system.

Performance simulations on non-linear channel ware made using a BICM scheme in which a good binary code is mapped onto the non-binary modulation symbols through Gray mapping (see FIG. 18).

Concerning the selection of the binary code itself, the key point is the simple, yet fundamental, fact that a code which performs very well can be obtained from a not-too-complex good binary code. The output of this code, taken as a block, is randomly permuted, and then passed through a simple accumulator code. It has been shown that this procedure can improve the performance, and approach the ultimate Shannon limit by adding a certain number of these permutation-accumulator blocks at the output of the first code. As a matter of fact, the first block could be as simple as a repetition code, although some decoder implementation problems prevent us from choosing such a simple scheme. An high-level coder and decoder block diagram is shown in FIG. 18.

Decoding of this concatenated code proceeds iteratively, as is done for Turbo codes. The demodulator output is transformed into metrics, the code is decoded serially, and then information is fed back to the input. This feedback can be made to the de-mapper or at the accumulation code, as shown in FIG. 18. This procedure is repeated for a certain number of iterations, either a fixed value or until convergence is detected by means of some stopping rule.

Taking into account these remarks, two codes of rate 3/4 have been chosen for a final trade-off. The first is based on the optimum 3/4 convolutional code, with 16 states. The second is in turn built around the optimum 64-state, rate 1/2 convolutional code, punctured to rate 3/4. Although both have similar performance in the so-called "waterfall" region, where the former beats the latter by about 0.15 dB, the second is expected to have a lower floor, well below the QEF point. Experimental evidence not reported herein indicates that the QEF can also be achieved by simpler codes, e.g. with 8 or 16 states, by using a random interleaver. The whole coding and modulation subsystem consists of the serial concatenation of this code, connected with an accumulator through a pseudo-random permutation. The mapping to the modulation is the already mentioned Gray mapping, with an interleaver between the stages of coding and modulation.

Concerning the decoding complexities of these codes, a simple calculation gives an increase in complexity (with respect to a soft Viterbi decoder for the standard 64-state, rate 1/2 convolutional code), of about 20–40 times for each case. The decoding algorithm for each constituent code, including the accumulator, is assumed to be 4 times as complex as the Viterbi algorithm would be for the same code. The decoding is done for a total of 10 iterations.

The remaining point to be considered is the decoding algorithm. The first step to be performed is the computation of the reliability of each received symbol. This is basically a calculation of the a posteriori probability of each modulation symbol $p(a_k|x_k)$, taking into account the received complex sample. This is closely related to the computation of the geometric distance between the demodulator complex samples and the reference 4+12-APSK constellation. The AGC and synchronization subsystems ensure a good match between the replica and the demodulator output samples. The previous step is done without any knowledge of the code itself The decoding procedure consists in updating the a posteriori probabilities of the information bits $p(b_k|x)$, taking into account all the received sequences $p(a_k|x_k)$, Vk, and the code structure. This is achieved through the so-called iterative sum-product decoding of the concatenated code, an approach introduced for turbo codes. A detailed presentation of the algorithm is outside the scope of this application. For a small number of permutation/accumulator blocks, the practical performance is good enough, within 1 dB of the Shannon limit for usual operating points.

The symbol clock estimation devised for trellis-coded modulation is also fully applicable to the current case of turbo coding. In fact the timing recovery algorithm described earlier herein works without any data knowledge and performs well even at low signal to noise ratios.

Concerning the AGC, in the case of a turbo coded signal we adopted the NDA approach described for trellis-coded modulation during the acquisition phase and reported earlier herein. For a loop adaptation step $\gamma_\alpha$ of $5.10^{-4}$, smaller than for TCM, the amplitude rms error provided by the NDA AGC, although higher than for TCM, is fully acceptable.

In case of turbo coding, the previously discussed decision-directed (DD) scheme exploiting trellis decoder tentative decisions cannot be adopted because of the unacceptable decoding delay which will cause instabilities in the carrier phase estimation loop. A known approach consists in the exploitation of the decisions of the first convolutional decoder and the hard decisions for the remaining coded symbols to wipe-off data modulation in the phase estimation process. However, the symbol decisions provided in this way are not expected to be significantly better than hard-decisions at the decoder input considering the very low operating SNR typical of a turbo decoder, and the weakness of the constituent codes.

Figure 19:
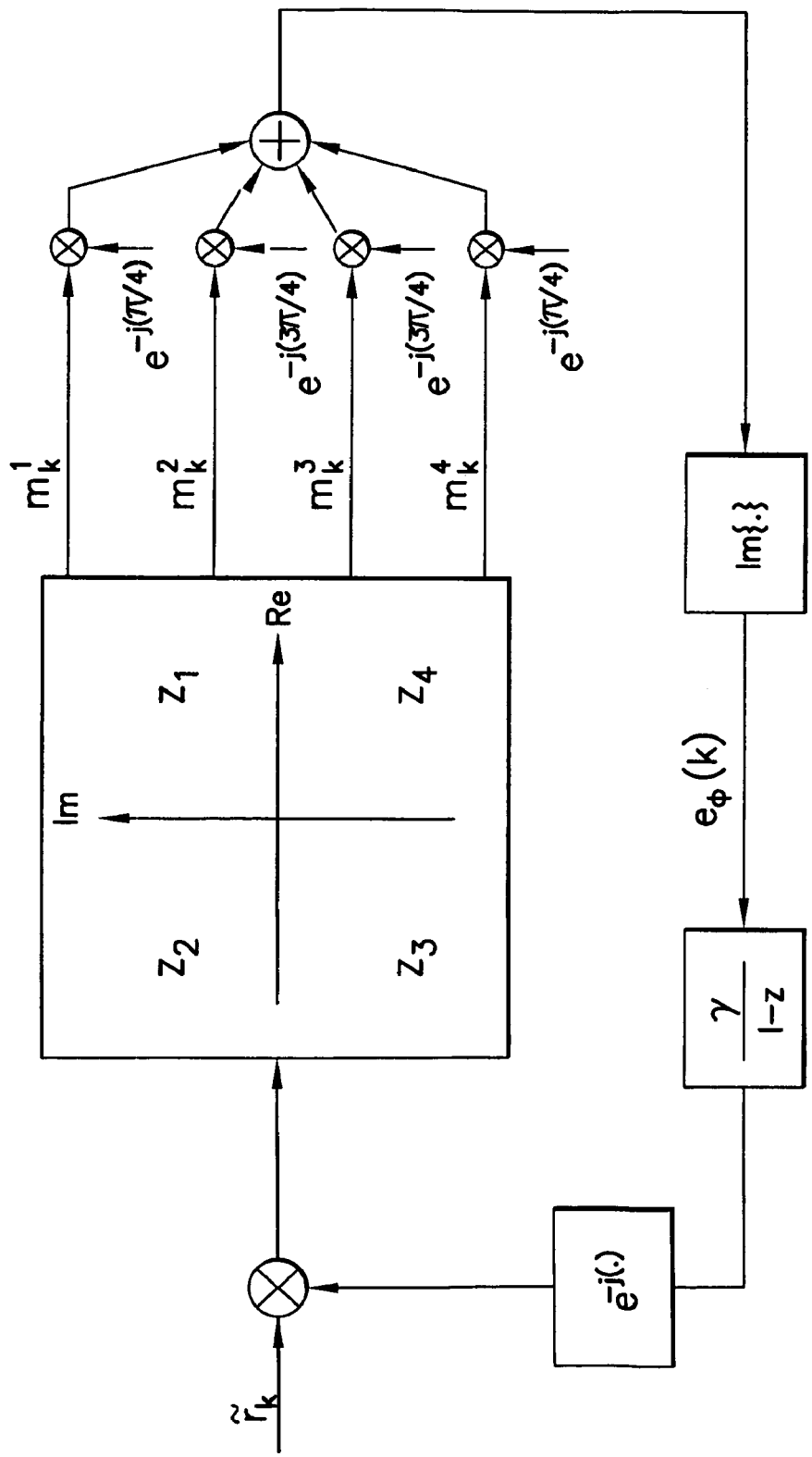
FIG. 19 represents a block diagram of a phase estimator.

In our specific case, the 16-ary APSK modulation symbol decisions required to wipe-out data modulation effects may be replaced by a simpler algorithm based on a four quadrant phase averaging. The idea consists in process the complex symbol matched filter samples according to the quadrant to which they belong. This corresponds to a simplified (amplitude independent) decision directed scheme, in which the original M-ary constellation collapses to the four points: $(\pm 1 \pm j)/\sqrt{2}$. In this way the average signal carrier phase can be simply estimated and the scheme is also robust to amplitude errors, thus easing the initial acquisition transient. An outline block diagram of the proposed estimator is shown in FIG. 19.

Designating the symbol matched filter output samples as $\check{r}_k$ the proposed phase error detector algorithm has the following form:

$$e_\Phi(k) = I\{m_k^{(1)} \exp(j\{\pi/4\}) + m_k^{(2)} \exp(-j\{3\pi/4\}) + m_k^{(3)} \exp(j\{3\pi/4\}) + m_k^{(4)} \exp(j\{\pi/4\})\}$$

where $$m_k^{(n)} = \check{r}_k^{(n)} i_k^{(n)} \text{ for } n = 1, 2, 3, 4$$

$$i_k^{(1)} = \begin{cases} 1 & \text{if } R\{\check{r}_k\} \geq 0, I\{\check{r}_k\} \geq 0 \\ 0 & \text{otherwise} \end{cases}$$

$$i_k^{(2)} = \begin{cases} 1 & \text{if } R\{\check{r}_k\} \geq 0, I\{\check{r}_k\} < 0 \\ 0 & \text{otherwise} \end{cases}$$

$$i_k^{(3)} = \begin{cases} 1 & \text{if } R\{\check{r}_k\} < 0, I\{\check{r}_k\} < 0 \\ 0 & \text{otherwise} \end{cases}$$

$$i_k^{(4)} = \begin{cases} 1 & \text{if } R\{\check{r}_k\} \geq 0, I\{\check{r}_k\} < 0 \\ 0 & \text{otherwise} \end{cases}$$

An alternative expression for the error term is:

$$E_\Phi(k) = I\{\check{r}_k \cdot c_k^*\} \tag{25}$$

where $\check{r}_k$ is the received sample, as before, and $c_k$ corresponds to a "hard decision" on the symbol, however limited to the four quadrants $Z_I$ shown in FIG. 19. The four possible values are $\exp j\{\pi[1+2(i-1)/4]\}$, $I = 1, 2, 3, 4$.

The proposed scheme averages out the signal points falling in each of the four complex plane quadrants exploiting the constellation symmetry to derive the reference phase with an ambiguity equal to $2\pi/12$. The proposed NDA phase error estimator has the advantage of being insensitive to possible amplitude errors that are typical of the acquisition phase. The proposed scheme corresponds to a DD phase estimator for QPSK (R. De Gaudenzi, T. Garde, V. Vanghi, *Performance Analysis of Decision-Directed Maximum-Likelihood Phase Estimator for M-PSK Signals*, IEEE Trans. on Comm., Vol.43, No.12, December 1995).

Because of the simplified four-quadrant decision approach its implementation is easier than a truly DD scheme for 4+12-APSK and decisions are insensitive to possible signal amplitude estimation errors. The main drawback of this scheme is related the so called pattern noise or irreducible phase jitter floor due to the phase error signal averaging for the four constellation points belonging to the same quadrant. This floor is not present with QPSK modulation, for which the exact Decision-Directed scheme and this simplified version are identical. In the absence of thermal noise the phase error estimator jitter irreducible variance can be easily computed observing FIG. 3 and averaging over $T_{av}$ the first quadrant four constellation points phase error with respect to the pi/4 axis as:

$$[\sigma_{e\Phi}^2]_{4Q} = T_s/4T_{av}[(\psi_1^1 - \pi/4)^2 + \sum_{i=1}^{3}(\psi_1^2 - \{\pi/4\}^2] \quad (26)$$
$$= T_s/4T_{av}[(\pi/4 - \pi/4)^2 + 2(5\pi/12 - \pi/4)^2]$$
$$= T_{s\pi}^2/72T_{av}$$

Note that the above pattern noise using a four quadrant algorithm is much less than that obtained with a two quadrant algorithm that can be easily derived from (24) above. In this case it is easy to show that the phase estimator irreducible jitter variance is given by averaging the first quadrant constellation points with respect to the real axis:

$$[\sigma_{e\Phi 2}^2]_{2Q} = T_s/4T_{av}[(\psi_1^1)^2 + \sum_{i=1}^{3}(\psi_1^2)^2] \quad (27)$$
$$= T_s/4T_{av}[2(\pi/4)^2 + (\pi/12)^2 + (5\pi/12)^2]$$
$$= T_s 22\pi^2/72T_{av}$$

which is 22 times larger than the value from equation (26). For this reason the four quadrant scheme was selected as it provides a good trade-off between robustness, complexity and performance. The presence of a small irreducible phase jitter has no practical impact for demodulators typically operating at $E_b/N_0 < 10$ dB and characterized by a loop bandwidth $B_{L\Phi}T_s$ lower than $10^{-4}$.

The error signal $e_k$ is then used to update the first order phase loop phase according to:

$$\Phi(k) = \Phi(k-1) - \gamma_\Phi e_\Phi(k) \quad (28)$$

where the loop gain is related to the bandwidth by the following relation:

$$\gamma_\Phi = 4B_{L\Phi}T_s/[A_\Phi(1+2B_{L\Phi}T_s)] \quad (29)$$

Note that the phase discriminator S-curve $A_\Phi$ is dependent on the actual $E_b/N_0$. Thus the relation above is typically dependent on the operating $E_b/N_0$. It is common practice to compute the discriminator slope $A_\Phi$ for $E_b/N_0 = \infty$ and to refer in the simulations to:

$$B_{L\Phi}T_s(\infty) = B_{L\Phi}T_s|E_b/N_0 = \infty \quad (30)$$

The phase discriminator S-curve can also be analytically derived for small phase errors as:

$$S_\theta(\Delta\theta)|_{Eb/N0 = \infty} = <E\{e_\Phi(k)|\theta_{k-\Delta\theta}\}> = \sin \Delta\theta \quad (31)$$

Simulation results indicate that the performance is degraded with respect to the TC-DD scheme but remains acceptable even at low SNR. It was found that a phase jitter standard deviation of about 1 degree can be achieved at $E_b/N_0 = 5$ dB for $B_{L\Phi}T_s(\infty) = 5.10^{-5}$.

In principle, the proposed phase estimator can also work in feed-forward mode by performing a moving average of the complex error signal contained in the argument of the imaginary function in equation (24), and then extracting the complex signal phase. However, the discriminator S-curve shape is dependent on the actual $E_b/N_0$. While the shape has no major impact on the feedback configuration (apart from the above mentioned loop gain changes), for the feed-forward estimator the phenomenon implies a biased estimator for non-zero phase errors. This major drawback, due to low SNR quadrant decision errors, renders impractical the exploitation of the feed-forward phase estimator scheme.

The code used for the simulations was the one based on the rate 3/4 16-state convolutional code. Although we have not verified the results down to QEF operation, we have confidence in the fact that QEF is achieved at values close to the ones mentioned in the paper. This is due to the fact that the error floor asymptote is very low, particularly for the 64-state code, and that the slope is very steep, down to the points we have simulated. It is therefore safe to extrapolate the performance for QEF from the values simulated in practice.

The following demodulator synchronizer settings have been adopted: $\gamma_\alpha = 10^{-3}$, $B_{L\gamma} = 10^{-3}$, $B_{L\theta} = 2.10^{-5}$. As for trellis coded modulation use was made of a third-order timing interpolator. For the simulations the rate 3/4 turbo codec described earlier herein has been adopted with an input frame block size of 16384 bits. When not specified, the number of decoder iterations has been set to 10.

Figure 20:
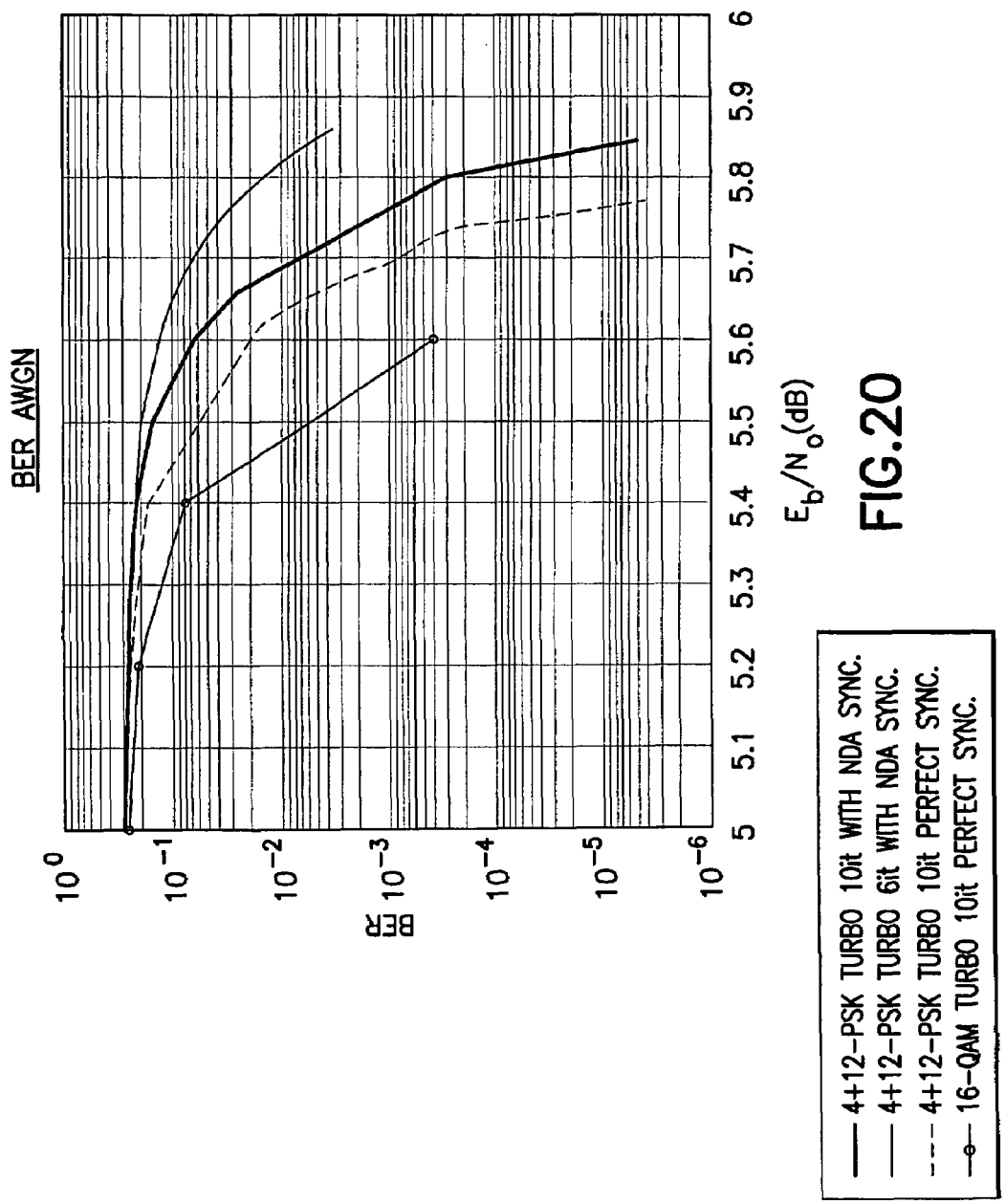
FIG. 20 illustrates the simulated BER curves for 16-QAM and 4+12 APSK schemes in the AWGN channel.

For the linear AWGN channel the results provided with and without channel estimation are shown in FIG. 20. It is observed that for QEF performance over the linear channel, the turbo coding gain is about 1.65 dB with respect to the 16 state trellis code concatenated with a trellis decoder and only 1.15 dB with respect to the 32-state trellis code. Additionally, we should add the 0.82 dB loss due to the Reed Solomon concatenation for the TCM case, absent for the turbo as mentioned before. This amounts to a total gain of about 2.0 dB, for an increase in complexity of a factor 20–40. For the sake of comparison, the same Figure shows the performance of 16-QAM with the same turbo code as well.

The impact of the digital synchronizer has been verified by simulation and it has been found to be less than 0.1 dB in the waterfall BER region of the turbo decoder. This was considered a very satisfactory result considering the simplicity of the NDA scheme adopted.

Figure 21:
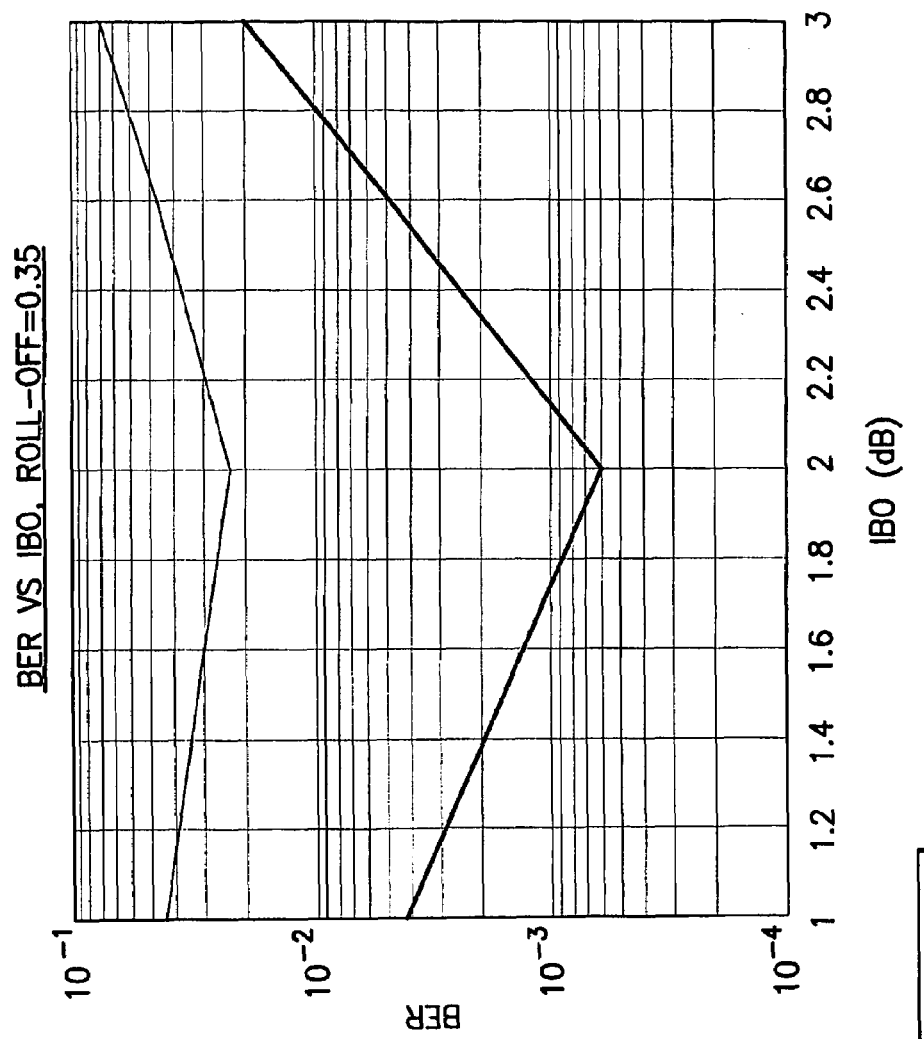
FIG. 21 shows the simulated BER curve versus IBO for a turbo-coded 4+12 APSK scheme in the non-linear channel.

Considering the limited gain provided by the non-linear equalizer for trellis-coded modulation, the scheme has been abandoned for the turbo case. The IBO was optimized, as shown in FIG. 21. The $E_b/N_0$ was selected in the middle of the waterfall BER region to allow for capturing the BER variation. Clearly optimization cannot be performed at $P^b = 10^{-10}$ but the current working point hardly differs from the QEF in terms of SNR. The decoder input SNR was computed based on the effective demodulator input $E_b/N_0$ previously defined $[E_b/N_0]_{eff}$.

Figure 22:
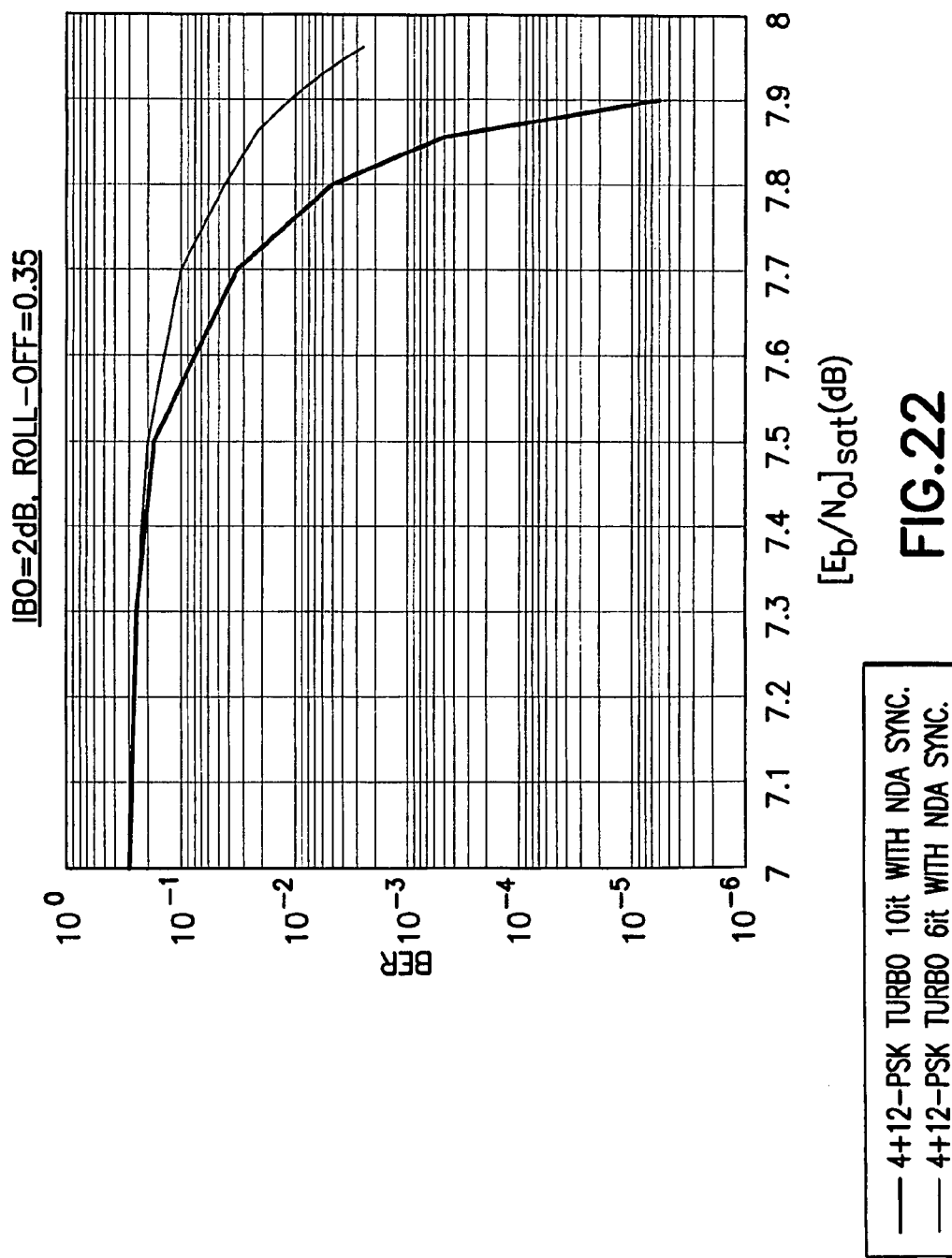
FIG. 22 shows the simulated BER curve for a turbocoded 4+12 APSK scheme in the non-linear channel with optimized IBO.

For the optimum IBO of 2 dB the BER over the non-linear channel was then simulated and the results are collected in FIG. 22. Thanks to the optimal combination of a powerful turbo code and a robust 4+12-APSK modulation we can operate over a typical satellite non-linear channel for QEF performance at an OBO of only 1.3 dB with a minimal degradation with respect to the linear channel of only 0.9 dB and with an operating $[E_b/N_0]_{imp} = 6.9$ dB, or equivalently $[E_b/N_0]_{sat} = 8.2$ dB. This shall be compared to the $[E_b/N_0]_{sat} = 13.1$ dB required by conventional TC-16-QAM over non-linear satellite channels (see Scheme 1 in Table 3 above herein.

This represents an improvement of about 5 dB in power and 8% in spectral efficiency compared to the conventional TC-16-QAM representing today's baseline for high-speed satellite links.

What is claimed is:

1. A digital modulation method, comprising:
   determining a nominal signal to noise ratio for transmission of a digitally modulated signal;

generating a stream of modulation symbols; and mapping said modulation symbols to a digital signal constellation in order to produce a modulated signal, said digital signal constellation comprising a number of digital signal points equally spaced on at least two concentric rings having respective predetermined radii, the digital signal points on each ring having a predetermined relative phase shift with respect to the signal points on the other rings;

wherein at least a ratio of the radii of said concentric rings is chosen so as to maximize a channel capacity for said nominal signal to noise ratio.

2. A digital modulation method according to claim 1, further comprising:

choosing the predetermined relative phase shift of the digital signal points on each ring with respect to the signal points on the other rings in order to maximize the channel capacity for said nominal signal to noise ratio.

3. A digital modulation method according to claim 1, wherein said generating said stream of modulation symbols comprises performing channel coding of an information bit stream.

4. A digital modulation method according to claim 3, wherein said mapping of said modulation symbols to said digital signal constellation comprises coupling a channel coder to a modulator through a block interleaver.

5. A digital modulation method according to claim 4, wherein said mapping of said modulation symbols to said digital signal constellation further comprises mapping an interleaved output of said channel coder to said digital signal constellation through Gray mapping.

6. A digital modulation method according to claim 1, wherein said digital signal constellation comprises at least a first ring containing four equally spaced digital signal points and a second ring, concentric to said first ring and having a larger radius, containing twelve equally spaced digital signal points.

7. A digital modulation method, comprising:

determining a nominal signal to noise ratio for transmission of a digitally modulated signal;

generating a stream of modulation symbols;

mapping said modulation symbols to a pre-distorted digital signal constellation in order to produce a modulated signal, said pre-distorted digital signal constellation comprising a number of digital signal points equally spaced on at least two concentric rings having respective predetermined radii, the digital signal points on each ring having a predetermined relative phase shift with respect to the signal points on the other rings; and transmitting said modulated signal through a nonlinear channel introducing a modification of said pre-distorted digital signal constellation;

wherein at least a ratio of the radii of the concentric rings of said pre-distorted digital signal constellation is chosen so that the digital signal constellation modified by the transmission through said nonlinear channel maximizes a channel capacity for said nominal signal to noise ratio.

8. A digital modulation method according to claim 7, further comprising:

choosing the predetermined relative phase shift of the digital signal points on each ring with respect to the signal points on the other rings of said digital signal constellation such that said distorted digital signal constellation maximizes the channel capacity for said nominal signal to noise ratio.

9. A digital modulation method according to claim 7, wherein said generating said stream of modulation symbols comprises performing channel coding of an information bit stream.

10. A digital modulation method according to claim 9, wherein said mapping of said modulation symbols to said digital signal constellation comprises coupling a channel coder to a modulator through a block interleaver.

11. A digital modulation method according to claim 10, wherein said mapping of said modulation symbols to said digital signal constellation further comprises mapping an interleaved output of said coder to said digital signal constellation through Gray mapping.

12. A digital modulation method according to claim 7, wherein said digital signal constellation comprises at least a first ring containing four equally spaced digital signal points and a second ring, concentric to said first ring and having a larger radius, containing twelve equally spaced digital signal points.

* * * * *

UNITED STATES PATENT AND TRADEMARK OFFICE
CERTIFICATE OF CORRECTION

PATENT NO.        : 7,123,663 B2
APPLICATION NO. : 10/163167
DATED             : October 17, 2006
INVENTOR(S)       : De Gaudenzi et al.

It is certified that error appears in the above-identified patent and that said Letters Patent is hereby corrected as shown below:

On the title page, under (75) Inventors: Correct the second inventor's name and residence to read:

-- Albert Guillen i Fabregas, Barcelona (ES) --

Signed and Sealed this

Nineteenth Day of December, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,123,663 B2 | |
| APPLICATION NO. | : 10/163167 | |
| DATED | : October 17, 2006 | |
| INVENTOR(S) | : De Gaudenzi et al. | |

It is certified that error appears in the above-identified patent and that said Letters Patent is hereby corrected as shown below:

On the title page of the patent, under (75) Inventors: Correct the second inventor's name and residence to read:

-- Albert Guillen i Fabregas, Barcelona (ES) --

Signed and Sealed this

Second Day of January, 2007

JON W. DUDAS
*Director of the United States Patent and Trademark Office*